(12) United States Patent
Setlur et al.

(10) Patent No.: US 10,351,035 B2
(45) Date of Patent: Jul. 16, 2019

(54) RETRACTABLE PIVOT PIN ASSEMBLY TO CONNECT SEATBACK TO RISER

(71) Applicant: Ford Global Technologies, LLC, Dearborn, MI (US)

(72) Inventors: Raghavan Narayan Setlur, West Bloomfield, MI (US); George Jacob, Kollam (IN)

(73) Assignee: Ford Global Technologies, LLC, Dearborn, MI (US)

(*) Notice: Subject to any disclaimer, the term of this patent is extended or adjusted under 35 U.S.C. 154(b) by 153 days.

(21) Appl. No.: 15/671,285

(22) Filed: Aug. 8, 2017

(65) Prior Publication Data

US 2019/0047446 A1 Feb. 14, 2019

(51) Int. Cl.
*B60N 2/20* (2006.01)
*B60N 2/90* (2018.01)
*B60N 2/22* (2006.01)
*B60N 2/30* (2006.01)

(52) U.S. Cl.
CPC .............. *B60N 2/933* (2018.02); *B60N 2/20* (2013.01); *B60N 2/2236* (2013.01); *B60N 2/3011* (2013.01)

(58) Field of Classification Search
CPC ...... B60N 2/2236; B60N 2/20; B60N 2/3011; B60N 2/3013; B60N 2/929; B60N 2/933; B60N 2/22
See application file for complete search history.

(56) References Cited

U.S. PATENT DOCUMENTS

| 4,925,227 | A | * | 5/1990 | Bateman | B61D 33/00 105/345 |
| 5,263,763 | A | * | 11/1993 | Billette | B60N 2/3013 296/63 |
| 5,273,336 | A | | 12/1993 | Schubring et al. | |
| 5,697,727 | A | * | 12/1997 | Harry | B60N 2/01533 296/63 |
| 6,312,037 | B1 | * | 11/2001 | Garrido | B60N 2/01558 296/65.03 |
| 9,132,748 | B2 | | 9/2015 | Park | |
| 9,352,672 | B2 | * | 5/2016 | Elton | B60N 2/43 |
| 9,399,411 | B2 | | 7/2016 | Kosuge et al. | |
| 2006/0125302 | A1 | * | 6/2006 | Shinozaki | B60N 2/2213 297/363 |
| 2019/0077284 | A1 | * | 3/2019 | Jacob | B60N 2/929 |

* cited by examiner

*Primary Examiner* — Jason S Morrow
(74) *Attorney, Agent, or Firm* — Vichit Chea; Price Heneveld LLP

(57) ABSTRACT

A vehicle comprises: a floor pan; a riser attached to the floor pan, the riser comprising a pin-guide surface at least partially surrounding a pin-receiving aperture, the pin-guide surface having an angled portion; and a seatback comprising a retractable pivot pin assembly, which includes a pin; inserted into the pin-receiving aperture of the riser; wherein, the pin is inserted into the pin-receiving aperture; and wherein, during the insertion of the pin into the pin-receiving aperture, the pin first contacts the angled portion of the pin-guide surface while the pin is in an extended state. During the insertion of the pin into the pin-receiving aperture, as the pin moves toward the pin-receiving aperture, the angled portion of the pin-guide surface forces the pin toward a retracted state within the retractable pivot pin assembly.

20 Claims, 34 Drawing Sheets

RETRACTABLE PIVOT PIN ASSEMBLY TO CONNECT SEATBACK TO RISER

FIELD OF THE INVENTION

The present invention generally relates to a retractable pivot pin assembly for attachment to, among other things, a seatback to pivotally attach the seatback to a riser, and a novel riser therefore.

BACKGROUND OF THE INVENTION

Seating assemblies, especially rear seating assemblies, sometimes include a seatback that pivots relative to a seat. However, complicated and expensive assemblies are typically used to establish the pivotable relationship.

SUMMARY OF THE INVENTION

According to a first aspect of the present invention, a riser for a seating assembly of a vehicle comprises: a pin-receiving aperture; a pin-guide surface at least partially surrounding the pin-receiving aperture, the pin-guide surface having an angled portion; and a lip partially surrounding the pin-receiving aperture defining a boundary of the pin-guide surface; wherein, the angled portion of the pin-guide surface and the lip form a mouth leading toward the pin-receiving aperture.

Embodiments of the first aspect of the invention can include any one or a combination of the following features:
  The lip surrounds at least 180 degrees of the pin-receiving aperture;
  A vertical support structure with a planar vertical surface;
  The pin-receiving aperture is parallel to the planar vertical surface and on a plane indented relative to the planar vertical surface
  The pin-guide surface includes a planar portion surrounding the pin-receiving aperture that is parallel to the planar vertical surface of the vertical support structure;
  A seat-receiving aperture located below the pin-receiving aperture;
  A transition from the planar vertical surface of vertical support structure to the planar portion of the pin-guide surface forms at least a portion of the lip; and
  The mouth is disposed above the pin-receiving aperture.

According to a second aspect of the present invention, a retractable pivot pin assembly for a vehicle comprises: a housing forming a chamber; and a pin partially housed within the chamber of the housing, the pin comprising a cylindrical shaft and a bit extending out from the cylindrical shaft along a length of the cylindrical shaft; wherein the pin has an extended state and can retract within the housing to a retracted state.

Embodiments of the second aspect of the invention can include any one or a combination of the following features:
  A compression spring defining a pin channel and including a first end and a second end;
  The pin further comprises a collar extending out from the cylindrical shaft;
  A portion of the pin is disposed within the pin channel and the first end of the compression spring abuts the collar;
  The compression spring biases the pin to the extended state;
  A backing cap abutting the second end of the compression spring, the backing cap including an aperture through which the pin can retract;
  The housing further comprises an end portion and an elongated portion laterally extending from the end portion, the elongated portion having snap-fit receivers;
  The end portion and the elongated portion forming the chamber housing at least a portion of the backing cap, the compression spring, and the retractable pivot pin;
  The backing cap further comprises snap-fit fasteners arranged around a perimeter of the backing cap;
  The snap-fit receivers of the elongated portion of the housing have received the snap-fit fasteners of the backing cap;
  An outer plate comprising a first planar portion, indented planar portions parallel to the first planar portion and indented from the first planar portion, a centrally located aperture with a slotted portion disposed through the first planar portion, a plurality of fastening apertures disposed through the first planar portion, a plurality of fastening apertures disposed through the indented planar portions.
  The elongated portion of the housing further comprises a plurality of legs terminating in orthogonally extending flanges, each of the flanges including an aperture;
  The outer plate is fastened to the housing via fasteners extending through the plurality of fastening apertures disposed through the first planar portion of the outer plate and a portion of the apertures disposed at the flanges of the legs of the housing;
  A portion of the plurality of legs of the housing each include a finger;
  The outer plate further includes slots disposed through the first planar portion adjacent the plurality of fastening apertures;
  The finger of each of the portion of the plurality of legs is slotted within the slots;
  The flanges of a portion of the plurality of legs abut the indented planar portion of the outer plate; and the flanges that abut the indented planar portion of the plate include an aperture disposed through the flange and the aperture lines up with one of the fastening apertures disposed through the indented planar portion of the outer plate.

According to a third aspect of the present invention, a vehicle comprises: a floor pan; a riser attached to the floor pan, the riser comprising a pin-guide surface at least partially surrounding a pin-receiving aperture, the pin-guide surface having an angled portion; and a seatback comprising a retractable pivot pin assembly, which includes a pin; inserted into the pin-receiving aperture of the riser; wherein, the pin is inserted into the pin-receiving aperture; and wherein, during the insertion of the pin into the pin-receiving aperture, the pin first contacts the angled portion of the pin-guide surface while the pin is in an extended state.

Embodiments of the third aspect of the invention can include any one or a combination of the following features:
  During the insertion of the pin into the pin-receiving aperture, as the pin moves toward the pin-receiving aperture, the angled portion of the pin-guide surface forces the pin toward a retracted state within the retractable pivot pin assembly;
  During the insertion of the pin into the pin-receiving aperture, as the pin moves adjacent to the pin-receiving aperture, the pin-guide surface has forced the pin to the retracted state within the retractable pivot pin assembly;
  During the insertion of the pin into the pin-receiving aperture, as the pin moves into the pin-receiving aperture, the pin returns to the extended state;

The retractable pivot pin assembly further comprises a compression spring that abuts a collar disposed on the pin;

The compression spring exerts a force on the collar to push the pin to the extended state; and The seatback further comprises a frame assembly providing structural support for the seatback and a bracket connected to the frame assembly, the bracket comprising a first side, a second side opposite the first side, and an aperture that extends from the first side through the second side;

The retractable pivot pin assembly is attached to the first side of the bracket, such that the pin of the retractable pivot pin assembly protrudes through the aperture of the bracket; and The bracket is between the compression spring of the retractable pivot pin assembly and the riser.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 3:
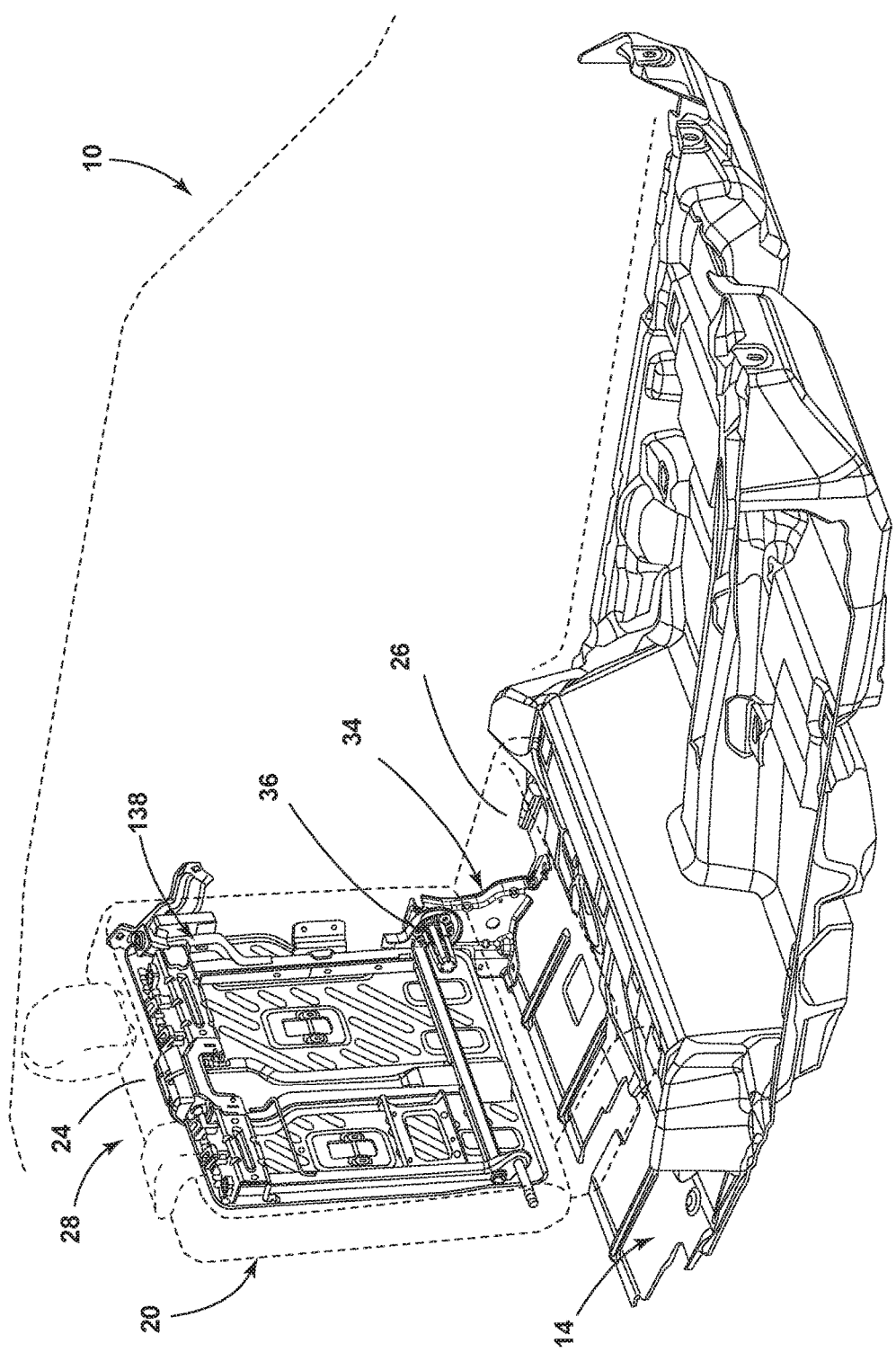
FIG. 3 is a perspective view of the rear seating assembly attached to the floor pan of FIG. 1, illustrating a frame assembly with a retractable pivot pin assembly coupled to a riser.
Figure 4:
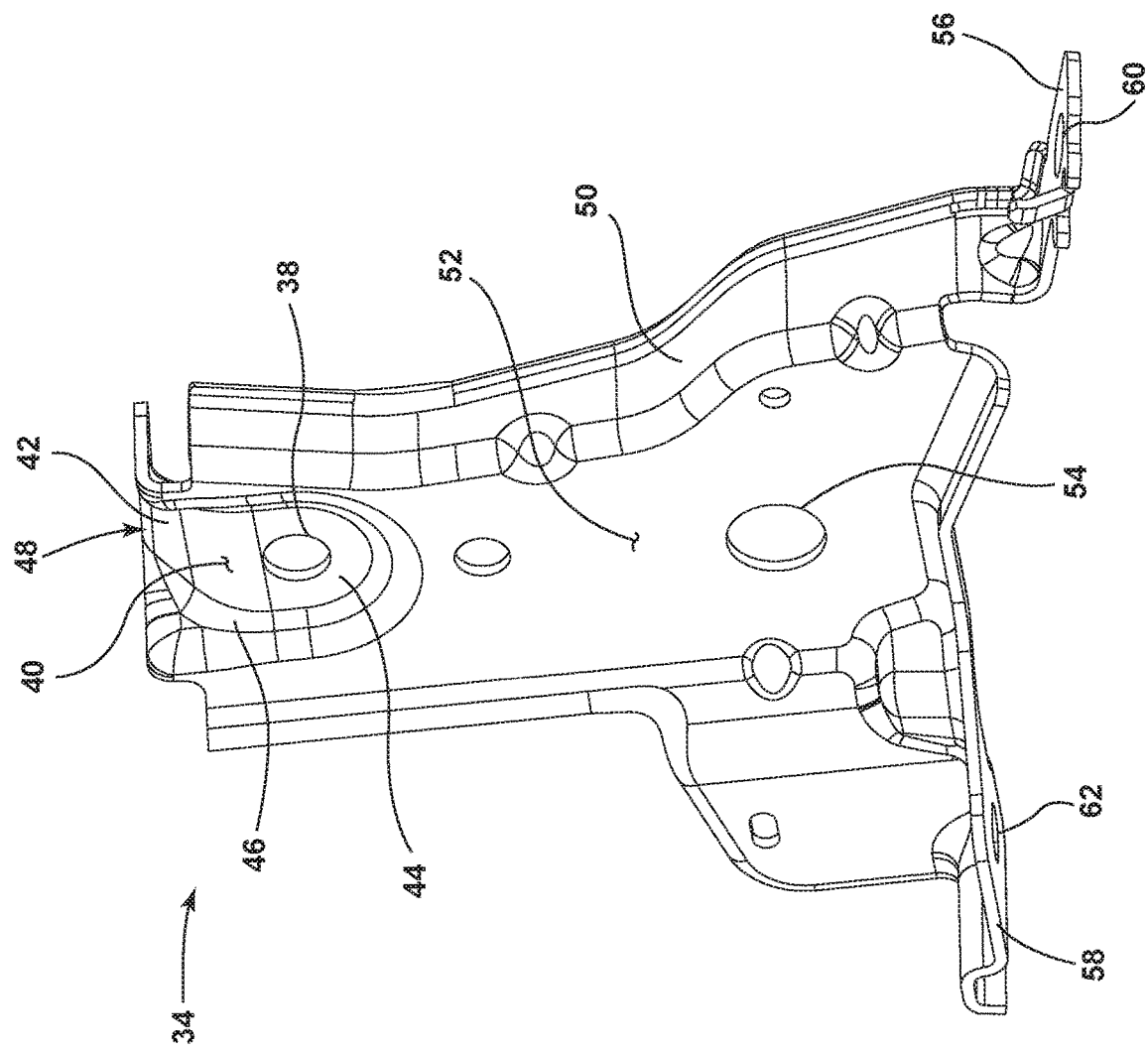
FIG. 4 is a perspective view of the riser of FIG. 3, illustrating a mouth leading to a pin-receiving aperture and a lip partially surrounding the aperture.
Figure 5:
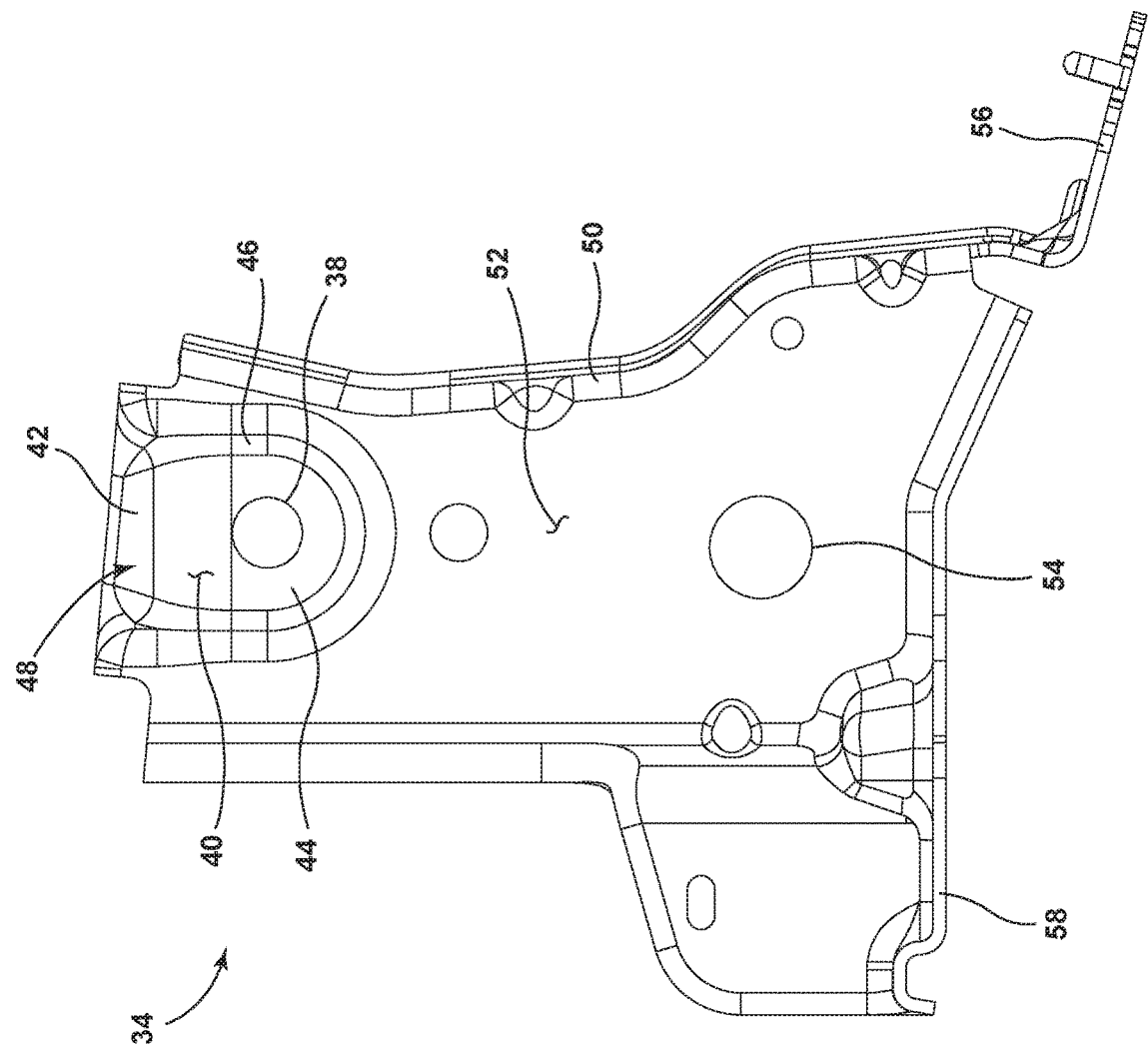
FIG. 5 is a side view of the riser of FIG. 3, illustrating a pin-guide surface with a planar portion and an angled portion surrounding the pin-receiving aperture.
Figure 6:
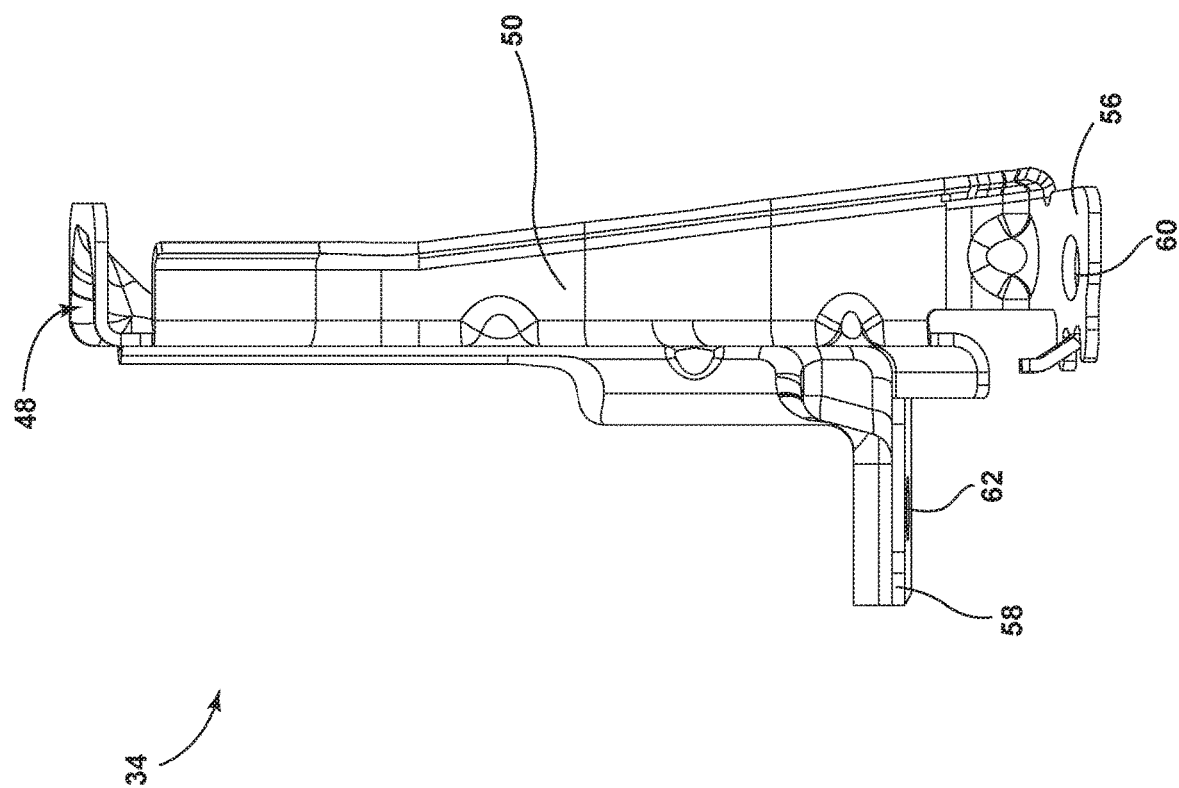
FIG. 6 is a view of the forward portion of the riser of FIG. 3, illustrating a vertical support structure separating the mouth from a first attachment portion and a second attachment portion.
Figure 7:
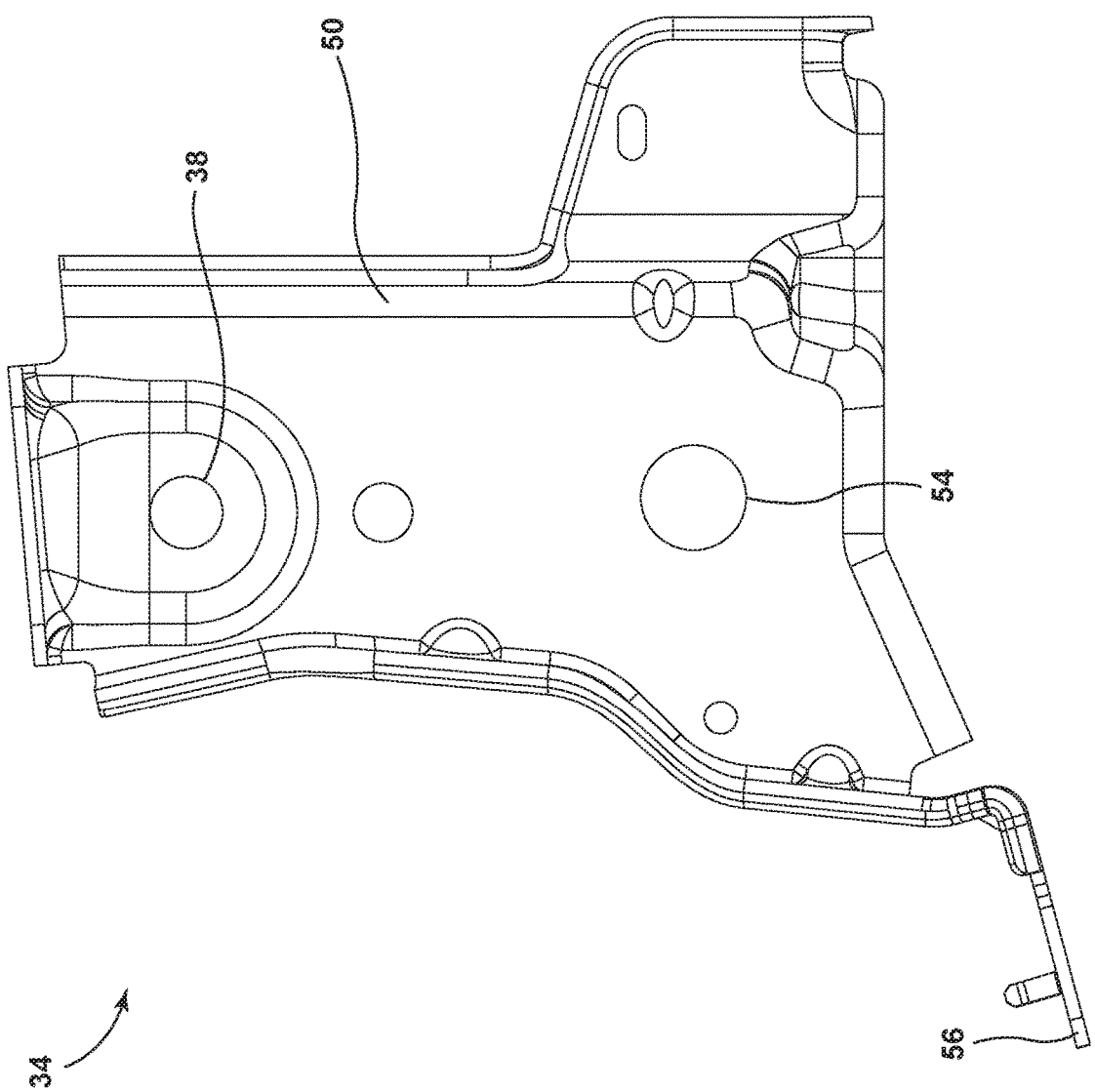
FIG. 7 is another side view of the riser of FIG. 3, opposite the side of FIG. 5, illustrating the pin-receiving aperture above a seat-receiving aperture.
Figure 8:
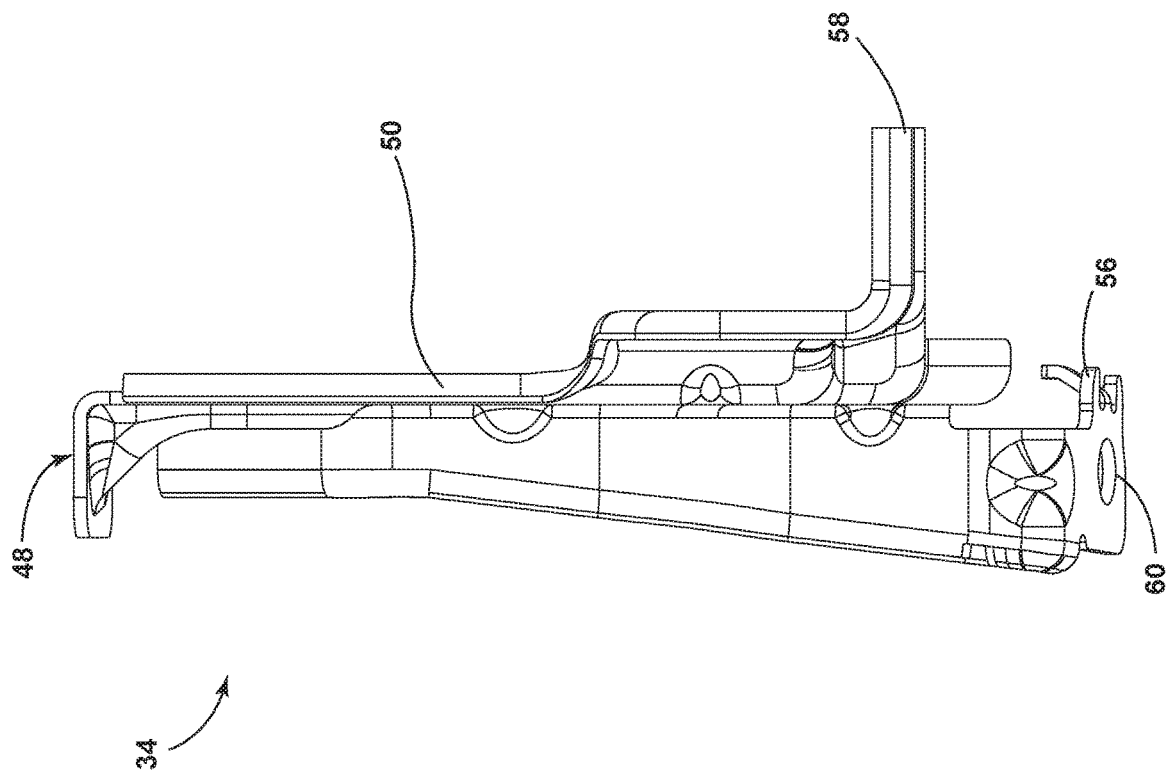
FIG. 8 is a view of the rearward portion of the riser of FIG. 3.
Figure 9:
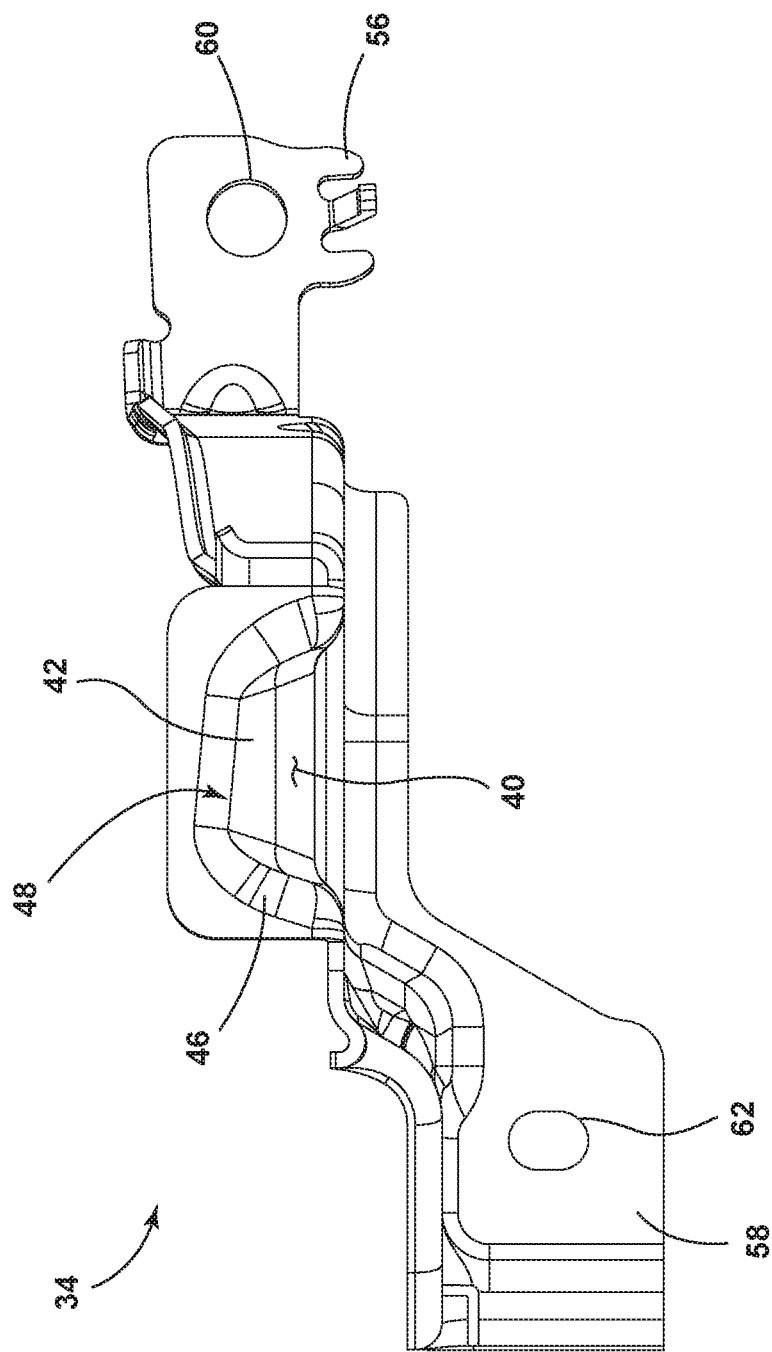
FIG. 9 is an overhead view of the riser of FIG. 3, illustrating the lip and the angled portion forming the mouth.
Figure 10:
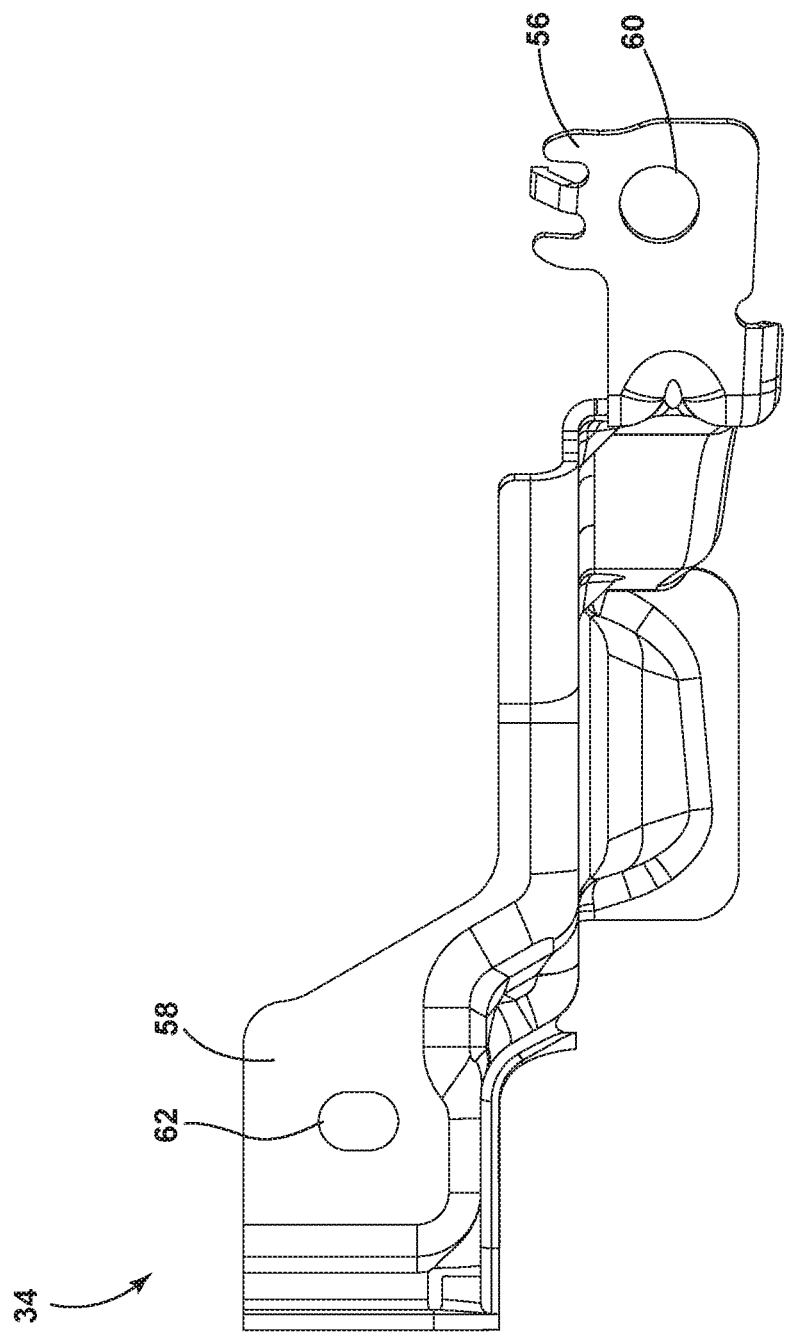
FIG. 10 is a bottom view of the riser of FIG. 3, illustrating an aperture with the first attachment portion and an aperture with the second attachment portion.
Figure 11:
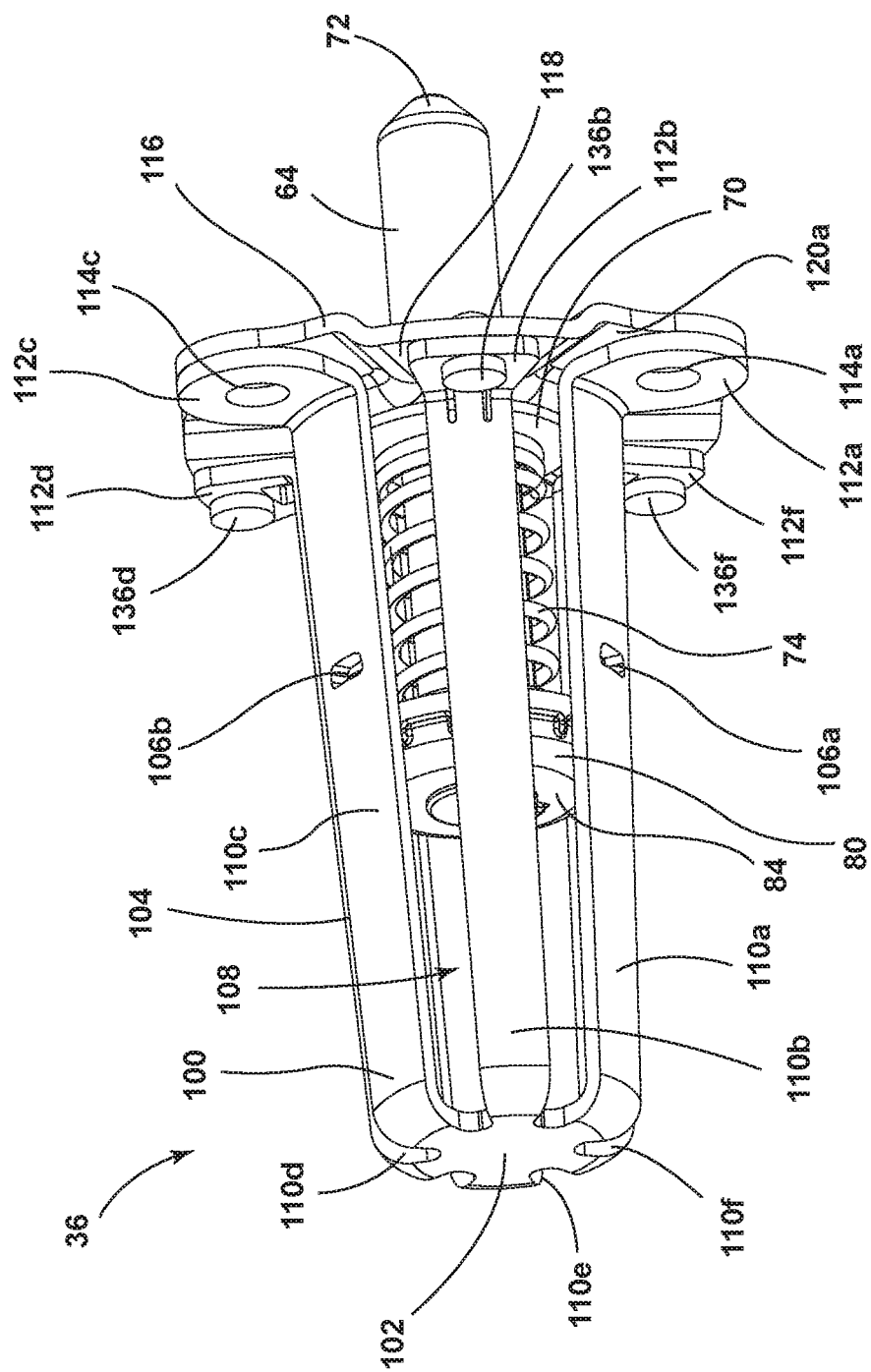
FIG. 11 is a perspective view of the retractable pivot pin assembly of FIG. 3, illustrating a housing attached to an outer plate and a rod within a chamber formed by the housing.
Figure 12:
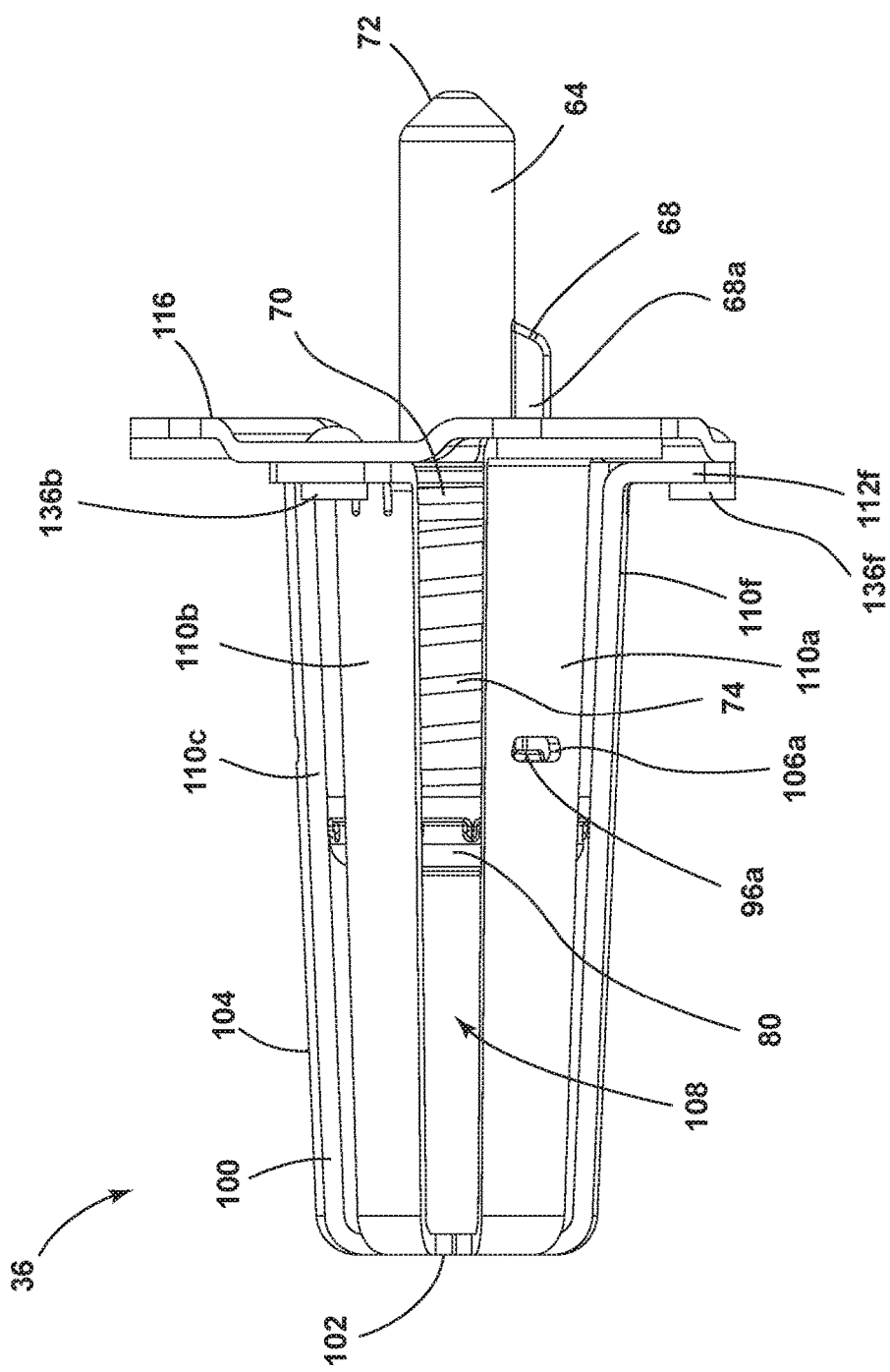
FIG. 12 is a view of the forward side of the retractable pivot pin assembly of FIG. 3, illustrating a backing cap and a compression spring also within the chamber of the housing.
Figure 13:
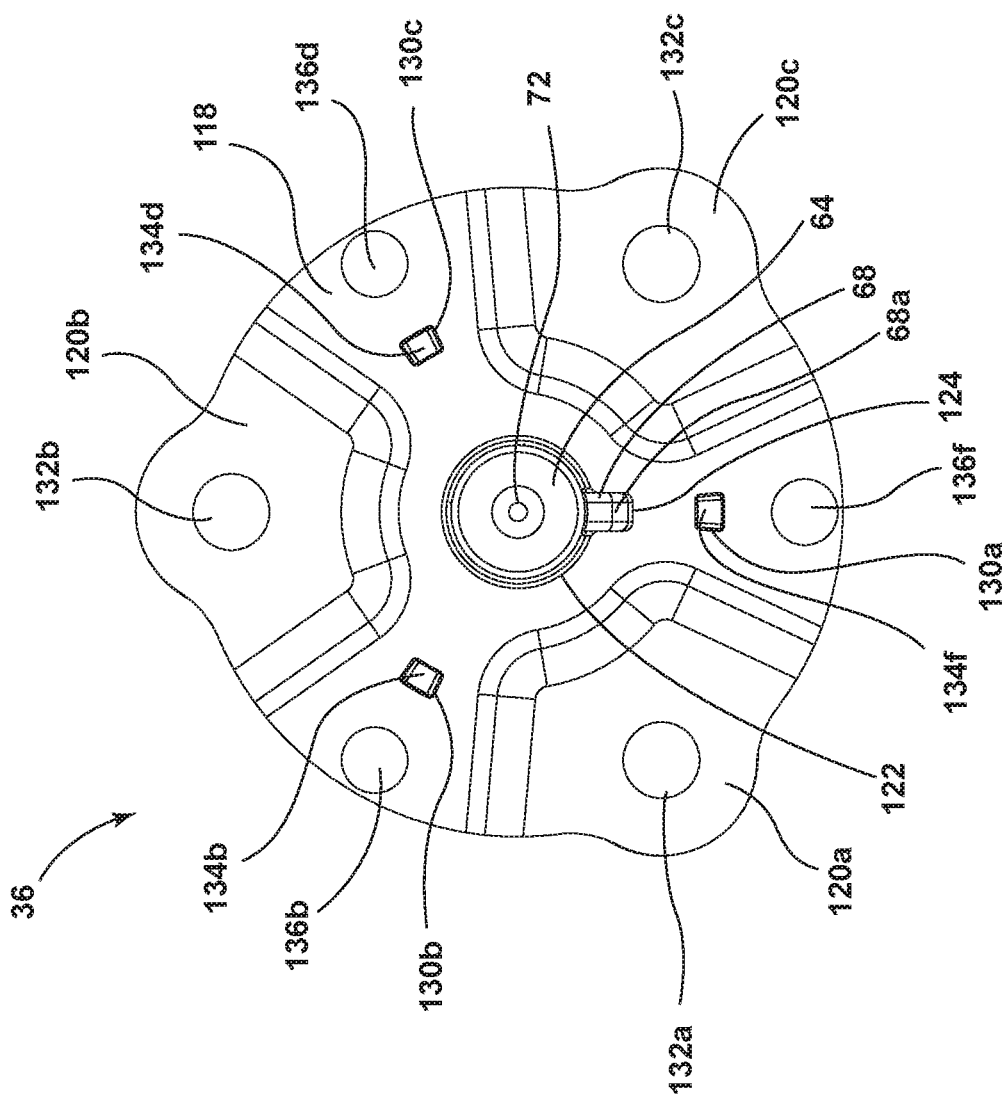
FIG. 13 is a side view of the retractable pivot pin assembly of FIG. 3, illustrating the rod extending through a centrally located aperture through the outer plate.
Figure 14:
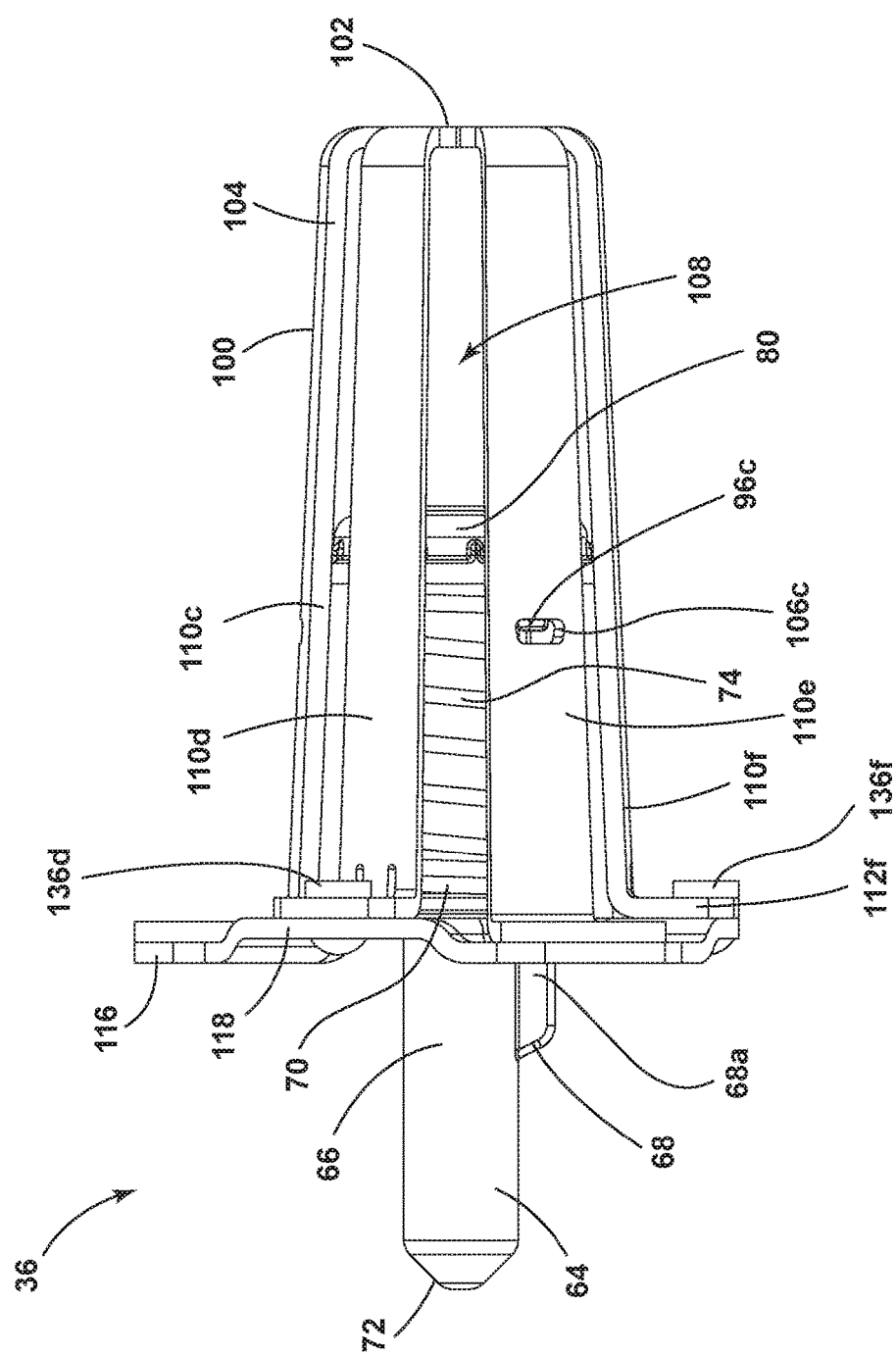
FIG. 14 is a view of the rear side of the retractable pivot pin assembly of FIG. 3.
Figure 15:
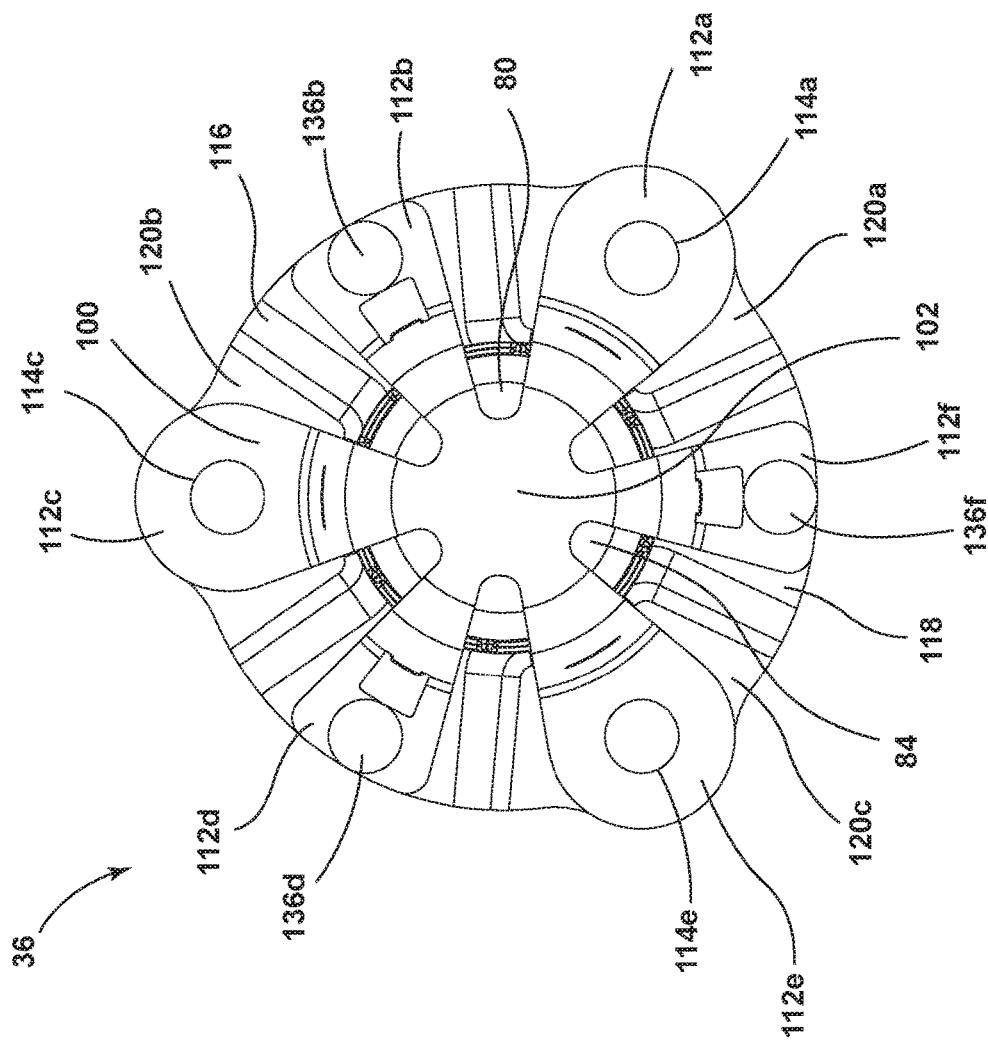
FIG. 15 is another side view of the retractable pivot pin assembly of FIG. 3, illustrating fasteners attaching the housing to the outer plate.

For purposes of description herein, the terms "upper," "lower," "right," "left," "rear," "front," "vertical," "horizontal," and derivatives thereof shall relate to the disclosure as oriented in FIG. 3. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
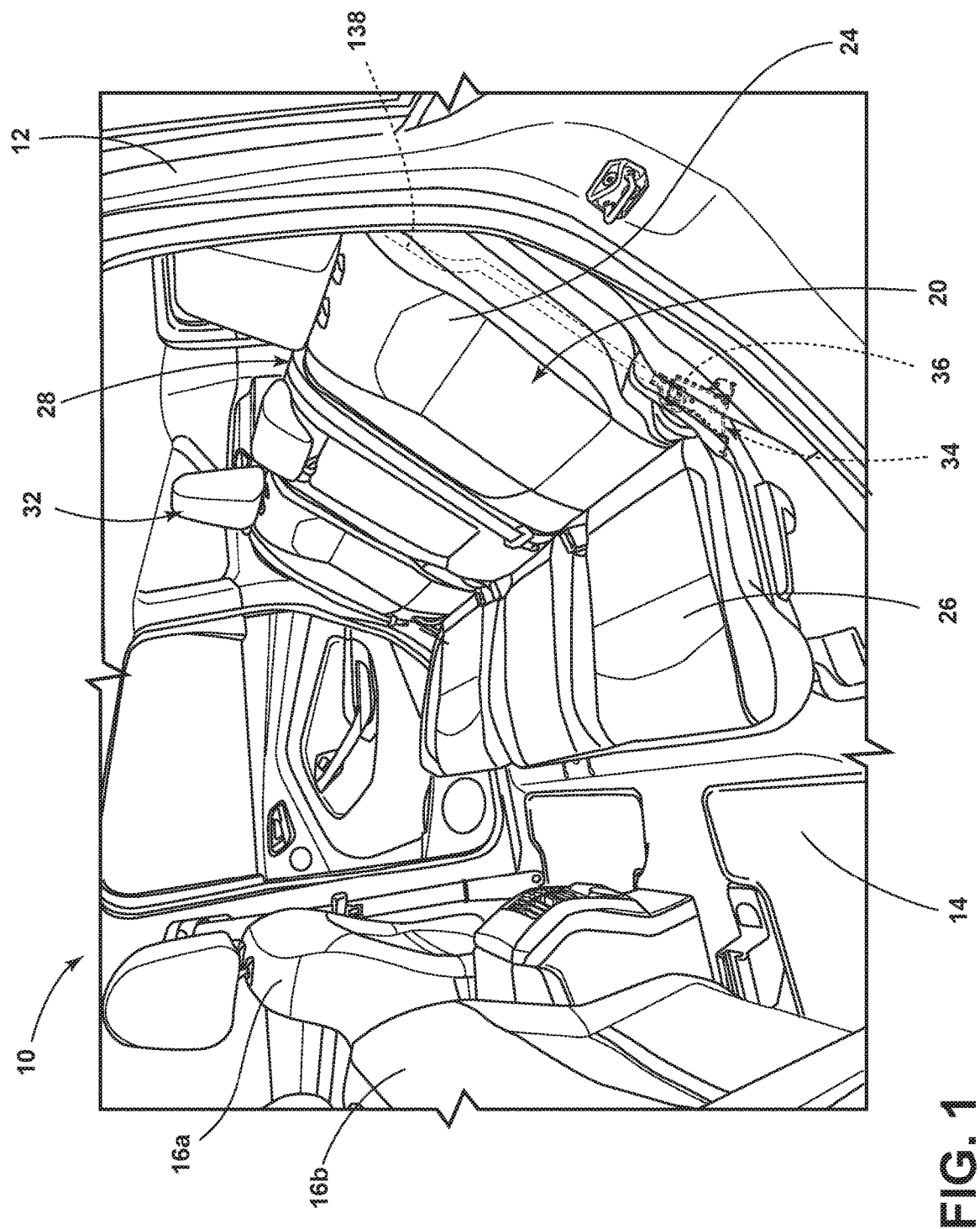
FIG. 1 is a perspective view of a vehicle, illustrating a rear seating assembly connected to a floor pan with a seat in an upright position.
Figure 2:
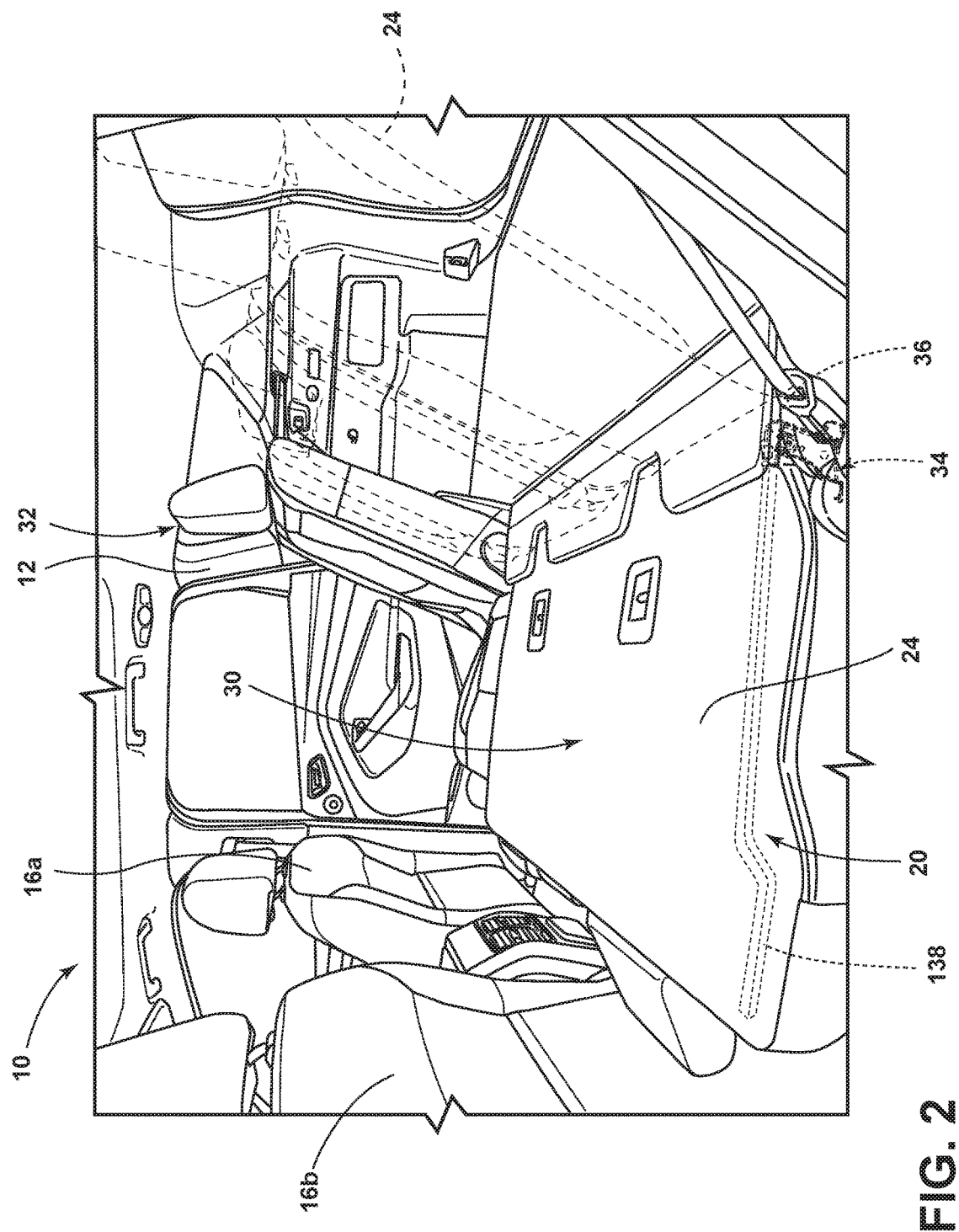
FIG. 2 is a perspective view of the rear seating assembly of FIG. 1 with the seat in the folded position.

Referring to FIGS. 1-2, a vehicle 10 includes a frame 12 with a floor pan 14, front seating assemblies 16a, 16b interconnected with the floor pan 14 toward the front (not shown) of the vehicle 10, and at least one rear seating assembly 20 interconnected with the floor pan 14 rearward of the front seating assemblies 16a, 16b. The rear seating assembly 20 includes a seatback 24 and a seat 26. The seatback 24 can pivot relative to the seat 26. In FIG. 1, the seatback 24 is illustrated in an upright position 28. In FIG. 2, the seatback 24 is illustrated in a folded position 30, that is, pivoted or folded over the seat 26. The rear seating assembly 20 can be disposed next to a second rear seating assembly 32. The vehicle 10 can be a car, sport utility vehicle, truck, or van, among other things.

Referring to FIG. 3, the seatback 24 of the rear seating assembly 20 is interconnected with the floor pan 14 via a riser 34. In other words, the seatback 24 is pivotally attached to the riser 34. The riser 34, in turn, is attached to the floor pan 14. Although not explicitly shown, the seat 26 of the rear seating assembly 20 may be likewise attached to the riser 34. The riser 34 elevates the rear seating assembly 20 from the floor pan 14. More specifically, the seatback 24 includes a frame assembly 138 interconnected with a retractable pivot pin assembly 36, which includes a cylindrical shaft (discussed below), that enters and pivots within a pin-receiving aperture (discussed below) in the riser 34.

Referring to FIGS. 4-10, the riser 34 includes a pin-receiving aperture 38. The pin-receiving aperture 38 receives a pin 64 (discussed below) of the retractable pivot pin assembly 36, which is attached to the frame assembly 138 of the seatback 24, allowing the seatback 24 to pivot.

The riser 34 further includes a pin-guide surface 40. The pin-guide surface 40 at least partially surrounds the pin-receiving aperture 38, and in the illustrated embodiment, fully surrounds the pin-receiving aperture 38. The pin-guide surface 40 includes an angled portion 42. As discussed below, the pin-guide surface 40 helps guide the pin 64 (discussed below) of the retractable pivot pin assembly 36 to the pin-receiving aperture 38, and the angled portion 42 gradually causes the pin to retract until it enters the pin-receiving aperture 38. The pin-guide surface 40 can further include, as in this embodiment, a planar portion 44 that surrounds the pin-receiving aperture 38. The planar portion 44 is contiguous with the angled portion 42.

The riser 34 further includes a lip 46. The lip 46 at least partially surrounds the pin-receiving aperture 38 and marks an outer boundary of the pin-guide surface 40. As discussed below, the lip 46 helps prevent the pin 64 of the retractable pivot pin assembly 36 from moving beyond the lip 46 and thus helps guide the pin 64 toward the pin-receiving aperture 38. The lip 46 surrounds at least half of the pin-receiving aperture 38, that is, at least 180 degrees of the pin-receiving aperture 38. In the embodiment illustrated, the lip 46 surrounds approximately 270 degrees of the pin-receiving aperture 38.

The angled portion 42 of the pin-guide surface 40 and the lip 46 form a mouth 48. The mouth 48 is an entrance leading toward the pin-receiving aperture 38. In this embodiment, the mouth 48 is disposed above the pin-receiving aperture 38. However, in other embodiments, the mouth 48 could be located to either side of the pin-receiving aperture 38, or any angle in between. As discussed below, the pin 64 of the retractable pivot pin assembly 36 approaches the pin-receiving aperture 38 from the mouth 48.

The riser 34 further includes a vertical support structure 50. The vertical support structure 50 is vertically oriented when the riser 34 is attached to the floor pan 14 (see FIG. 3). The vertical support structure 50, in this embodiment, includes a planar vertical surface 52. The pin-receiving aperture 38 is indented relative to the planar vertical surface 52. In other words, when the vertical support structure 50 is attached to the floor pan 14 (see FIG. 3), the aperture is more laterally oriented than the planar vertical surface 52 (that is, further away from a front/rear midline of the vehicle 10). The planar portion 44 of the pin-guide surface 40 is parallel to the planar vertical surface 52. Because the planar portion 44 is planar and the pin-receiving aperture 38 is surrounded by the planar portion 44, the pin-receiving aperture 38 is also planar. Thus, the pin-receiving aperture 38 is on a plane indented (that is, further away from a front/rear midline of the vehicle 10) relative to the planar vertical surface 52. As the planar portion 44 is indented relative to the planar vertical surface 52, a transition from the planar vertical surface 52 to the planar portion 44 of the pin-guide surface 40 forms a portion of the lip 46. In other words, the lip 46 marks a transition from the planar vertical surface 52 to the planar portion 44 of the pin-guide surface 40.

The riser 34 of the embodiment illustrated further includes a seat-receiving aperture 54. The seat-receiving aperture 54 receives an element of the seat 26, to interconnect the seat 26 with the floor pan 14. The seat-receiving aperture 54 can be within the planar vertical surface 52 and parallel to the pin-receiving aperture 38. The seat-receiving aperture 54 is located below the pin-receiving aperture 38, when the riser 34 is attached to the floor pan 14, that is, located closer to the floor-pan than the pin-receiving aperture 38.

The riser 34 further includes a first attachment portion 56 and a second attachment portion 58. The first attachment portion 56 and the second attachment portion 58 allow the riser 34 to be attached to the floor pan 14. For example, the first attachment portion 56 and second attachment portion 58 can be flanges with apertures 60, 62 respectively, matching apertures (not shown) in the floor pan 14, through which fasteners (not shown) can extend.

Figure 16:
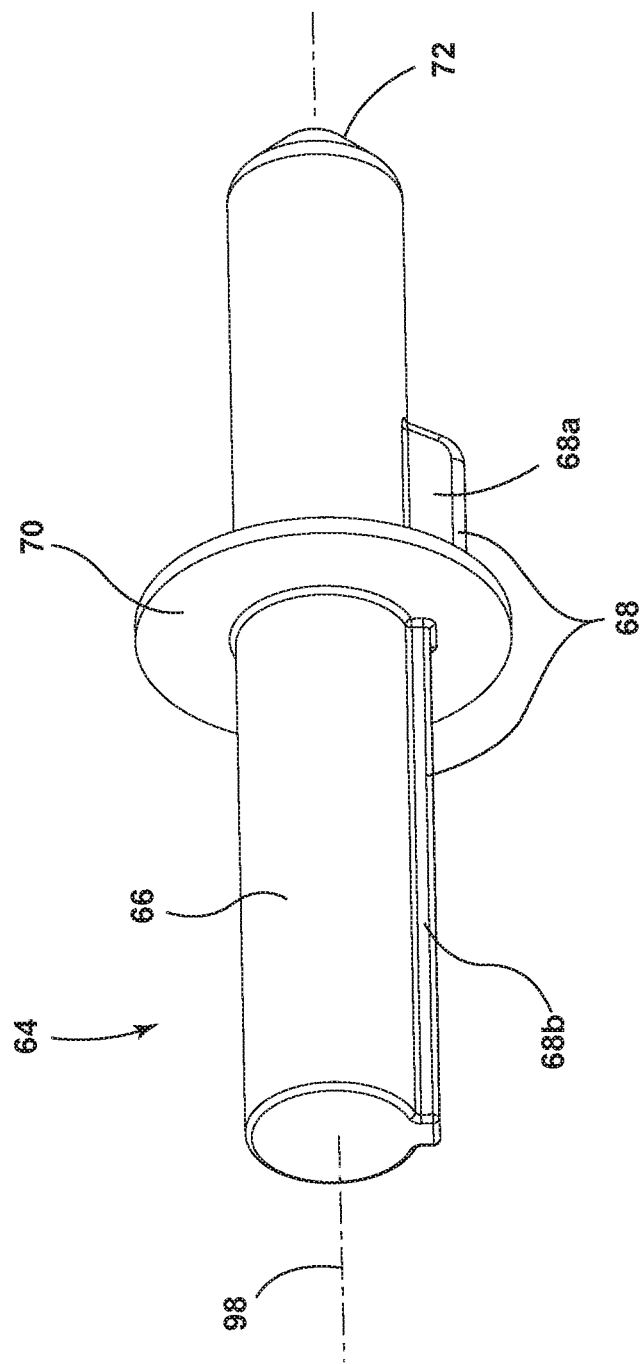
FIG. 16 is a perspective view of the rod used in the retractable pivot pin assembly of FIG. 3, illustrating a bit extending out from a cylindrical shaft.

Referring to FIGS. 11-28, as mentioned above, the retractable pivot pin assembly 36 includes a pin 64 (see particularly FIG. 16). The pin 64 includes a cylindrical shaft 66 and a bit 68 extending out from the cylindrical shaft 66 along a length of the cylindrical shaft 66. The bit 68 can include a larger section 68a and a smaller section 68b, which is smaller than (that is, does not extend out as far as) the larger section 68a. As discussed below, the bit 68 aids in assemblage of the retractable pivot pin assembly 36 and in preventing rocking after assembled. The pin 64 further includes a collar 70 extending out from the cylindrical shaft 66. The collar 70 is planar and circular. The collar 70 separates the larger section 68a of the bit 68 from the smaller section 68b. The pin 64 includes a chamfered end 72. The chamfered end 72 helps the pin 64 slide over the pin-guide surface 40 of the riser 34.

Figure 17:
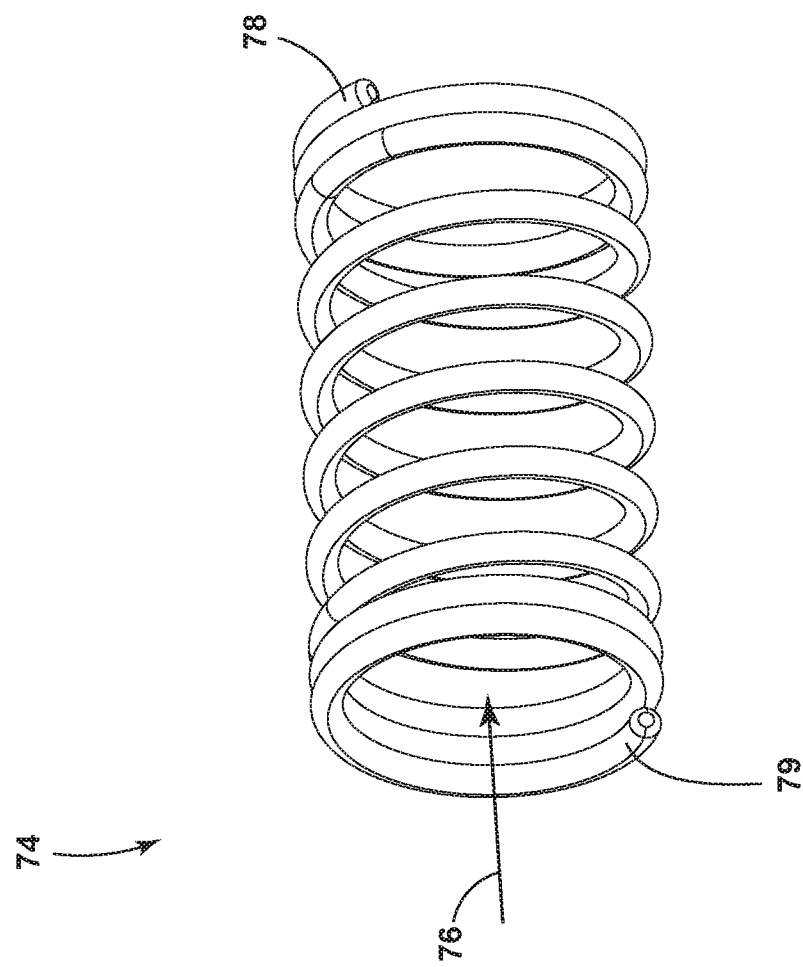
FIG. 17 is a perspective view of the compression spring used in the retractable pivot pin assembly of FIG. 3, illustrating a first end, a second end, and a pin channel.
Figure 18:
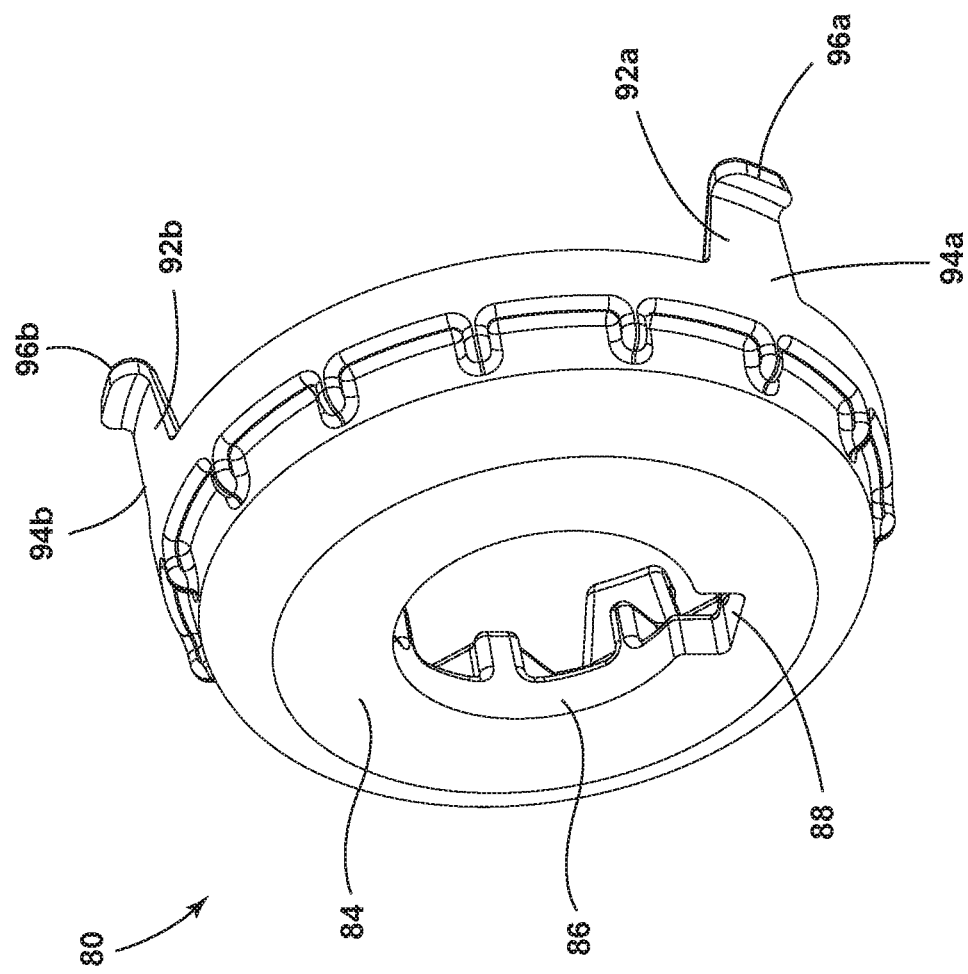
FIG. 18 is a perspective view of the backing cap used in the retractable pivot pin assembly of FIG. 3, illustrating an aperture with a slotted portion and a plurality of snap-fit fasteners.
Figure 19:
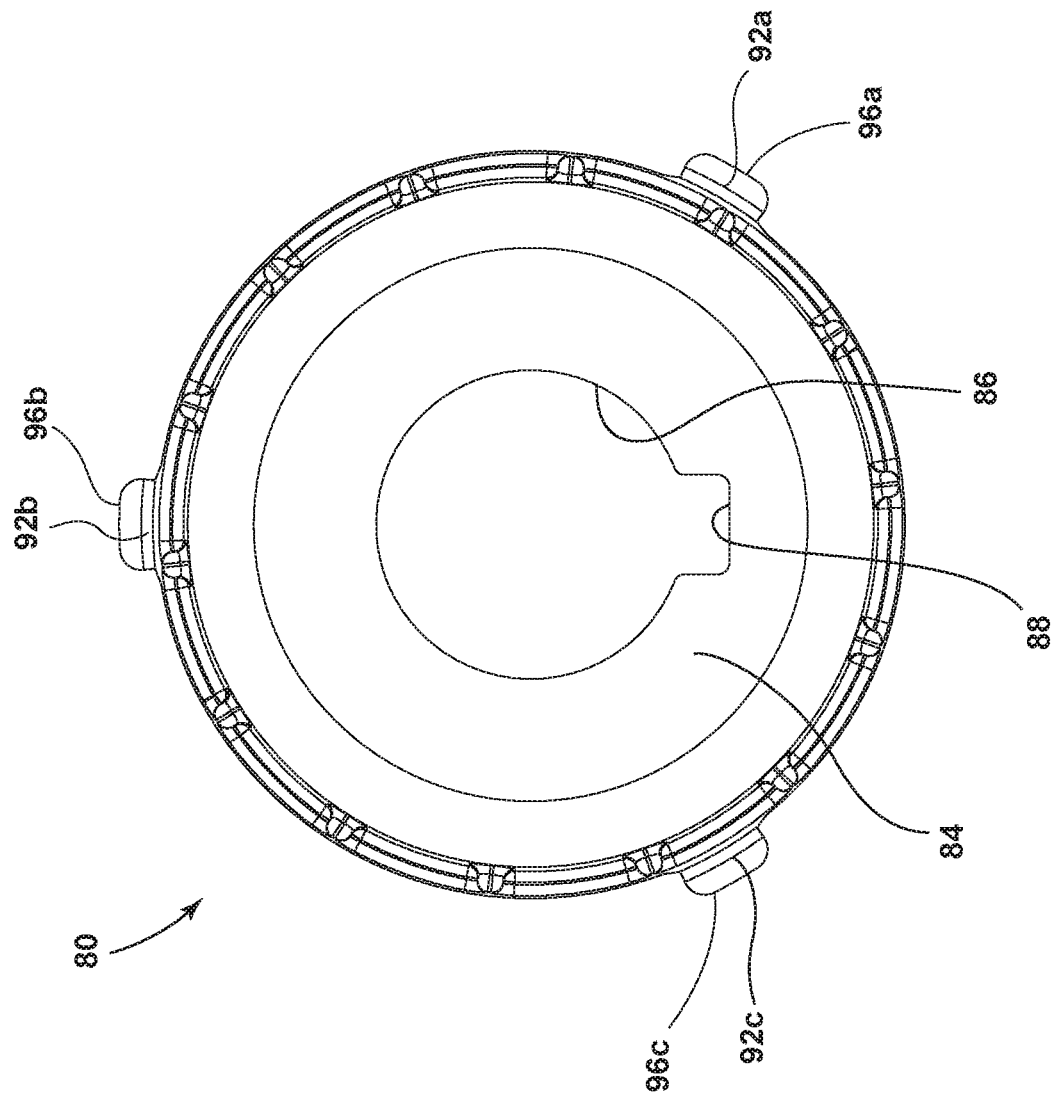
FIG. 19 is a side view of the backing cap, illustrating that each of the plurality of snap-fit fasteners terminate with a catch flange.
Figure 20:
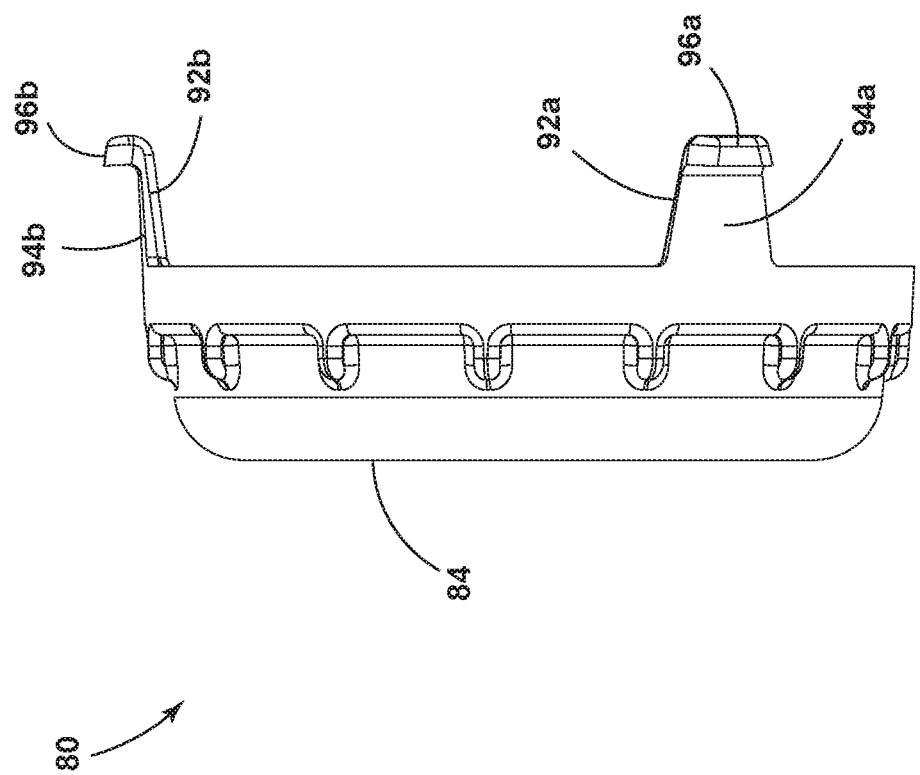
FIG. 20 is a view of the forward side of the backing cap, illustrating that each of the plurality of snap-fit fasteners include a cantilever portion that terminates with the catch flange.
Figure 21:
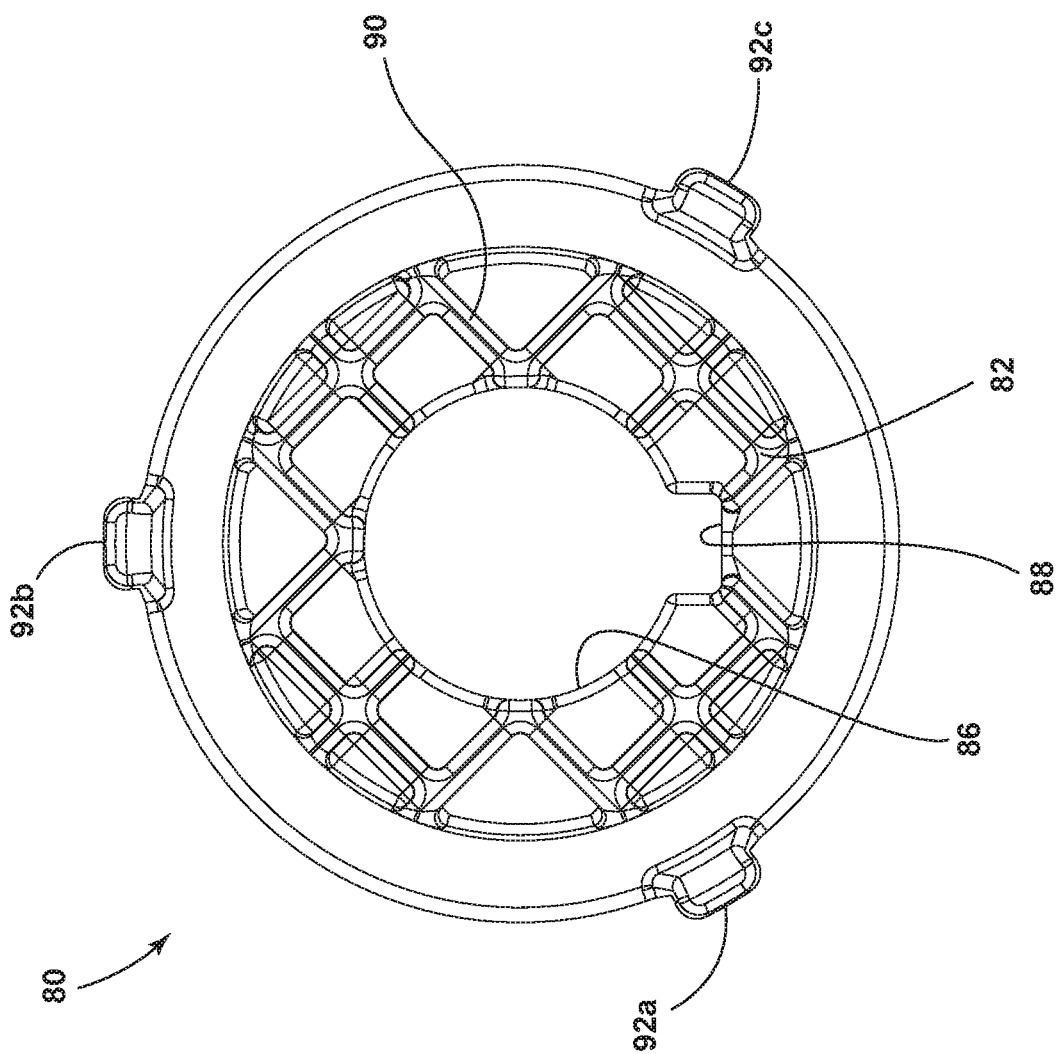
FIG. 21 is a view of the other side of the backing cap, illustrating ribs disposed on a cap side.

The retractable pivot pin assembly 36 further includes a compression spring 74 (see particularly FIG. 17). The compression spring 74 defines a pin channel 76. The compression spring 74 includes a first end 78 and a second end 79 opposite the first end 78. A portion of the pin 64 is disposed within the pin channel 76, such that the first end 78 of the compression spring 74 abuts the collar 70. In this embodiment, the portion of the pin 64 with the smaller section 68b of the bit 68 is disposed within the pin channel 76. As further explained below, the compression spring 74 allows the pin 64 to retract into the retractable pivot pin assembly 36 when a force is applied to the pin 64 (retracted state) and then return to the original un-retracted position (extended state) when the force is no longer applied. The compression spring 74 becomes excited when the pin 64 moves to the retracted state and thus biases the pin 64 to the extended state.

The retractable pivot pin assembly 36 further includes a backing cap 80 (see particularly FIGS. 18-21). The backing cap 80 includes a cap side 82 and another side 84 opposite the cap side 82. The cap side 82 of the backing cap 80 partially caps and abuts the second end 79 of the compression spring 74. The backing cap 80 includes an aperture 86. The aperture 86 is centrally located and extends through both the cap side 82 and the other side 84. The aperture 86 includes a slotted portion 88 to match and receive the bit 68 of the pin 64. As further explained below, the pin 64 can retract through the aperture 86, as a force is applied to the pin 64. The backing cap 80 further includes ribs 90 disposed on the cap side 82 to strengthen the backing cap 80. The backing cap 80 further includes snap-fit fasteners 92a-c, the purpose of which is discussed below. The snap-fit fasteners 92a-c each include a cantilever portion 94a-c terminating with an orthogonally extending catch flange 96a-c. For example, snap-fit fastener 92a includes a cantilever portion 94a terminating with an orthogonally extending catching flange 96a, and so on. The snap-fit fasteners 92a-c are arranged around the perimeter of the backing cap 80. The cantilever portion 94a-c extends generally orthogonally relative to the other side 84 of the backing cap 80 and generally parallel to an axis 98 of the pin 64 (see FIG. 16).

Figure 22:
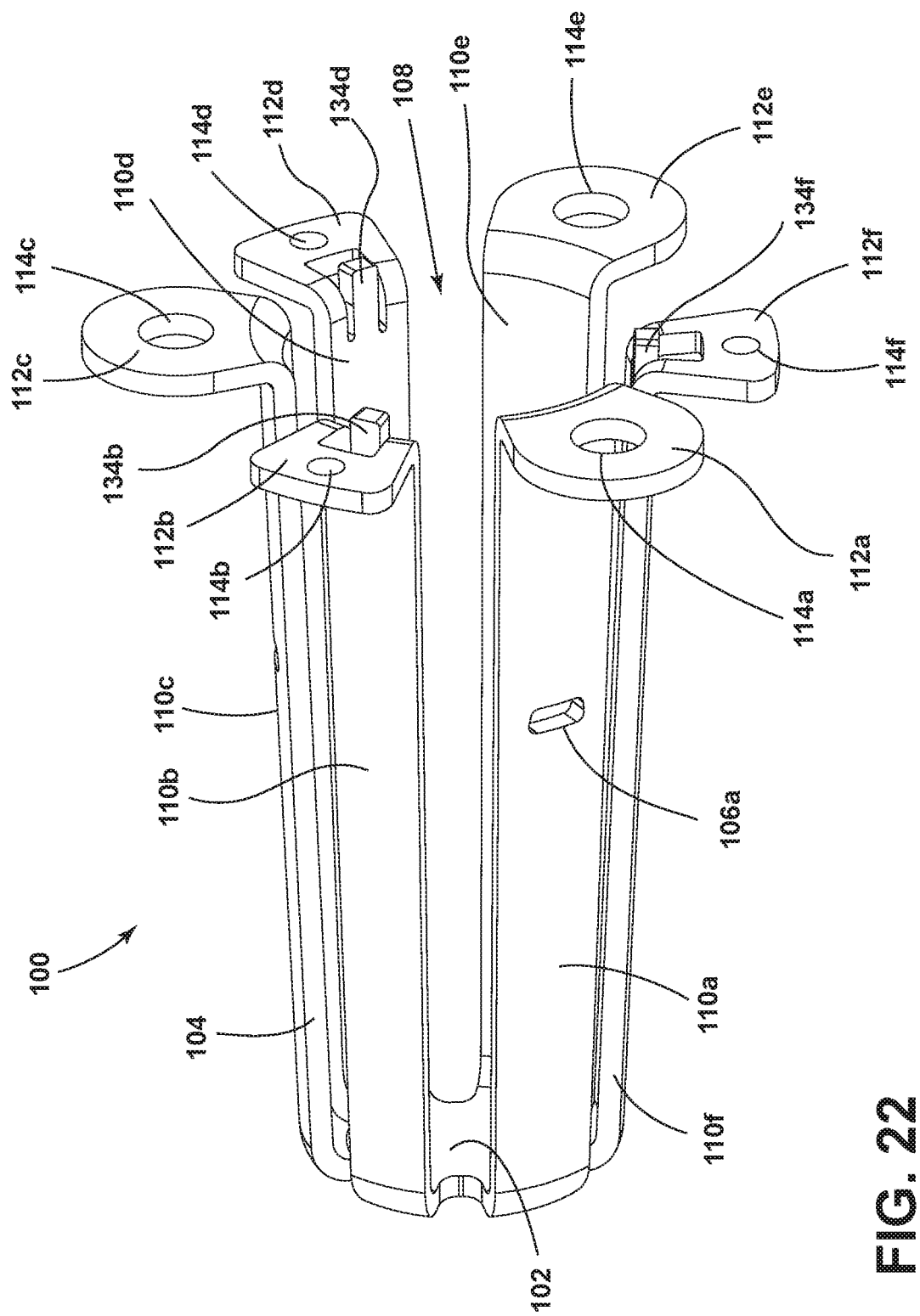
FIG. 22 is a perspective view of the housing used in the retractable pivot pin assembly of FIG. 3, illustrating an end portion and an elongated portion with a plurality of legs.
Figure 23:
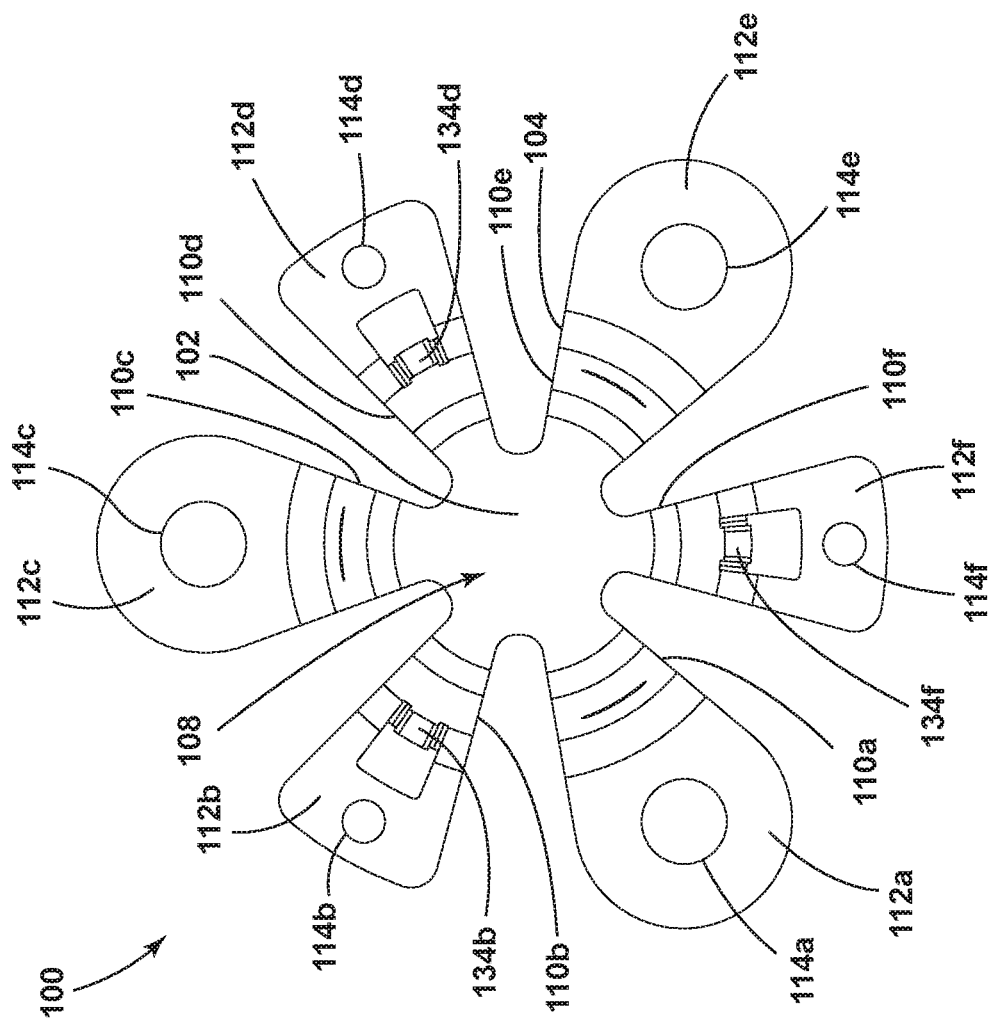
FIG. 23 is a lateral side view of the housing, looking into a chamber formed by the end portion and the elongated portion.
Figure 24:
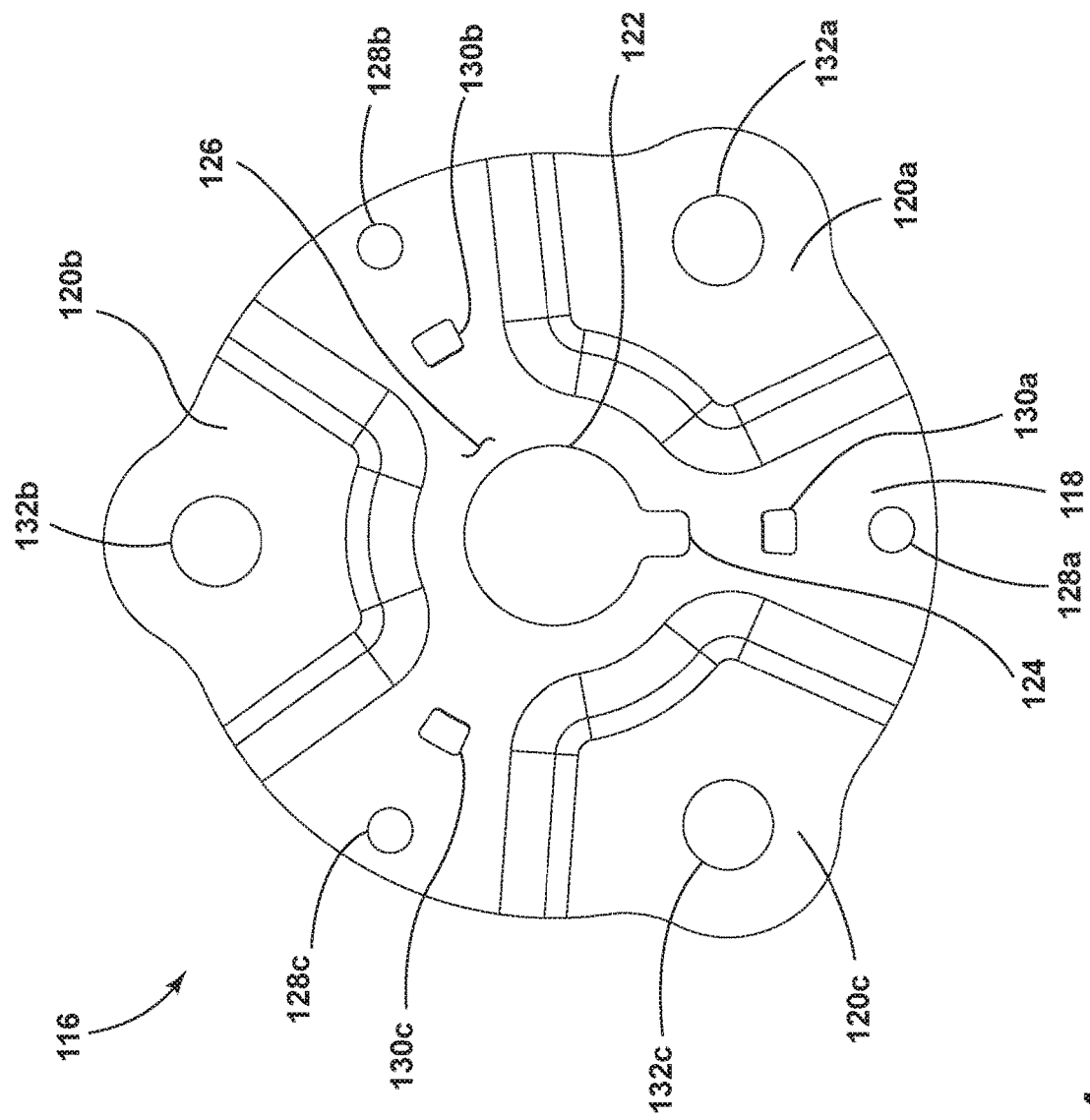
FIG. 24 is a view of the medial facing side of the outer plate used in the retractable pivot pin assembly of FIG. 3, illustrating a collar contacting surface and a first planar portion.
Figure 25:
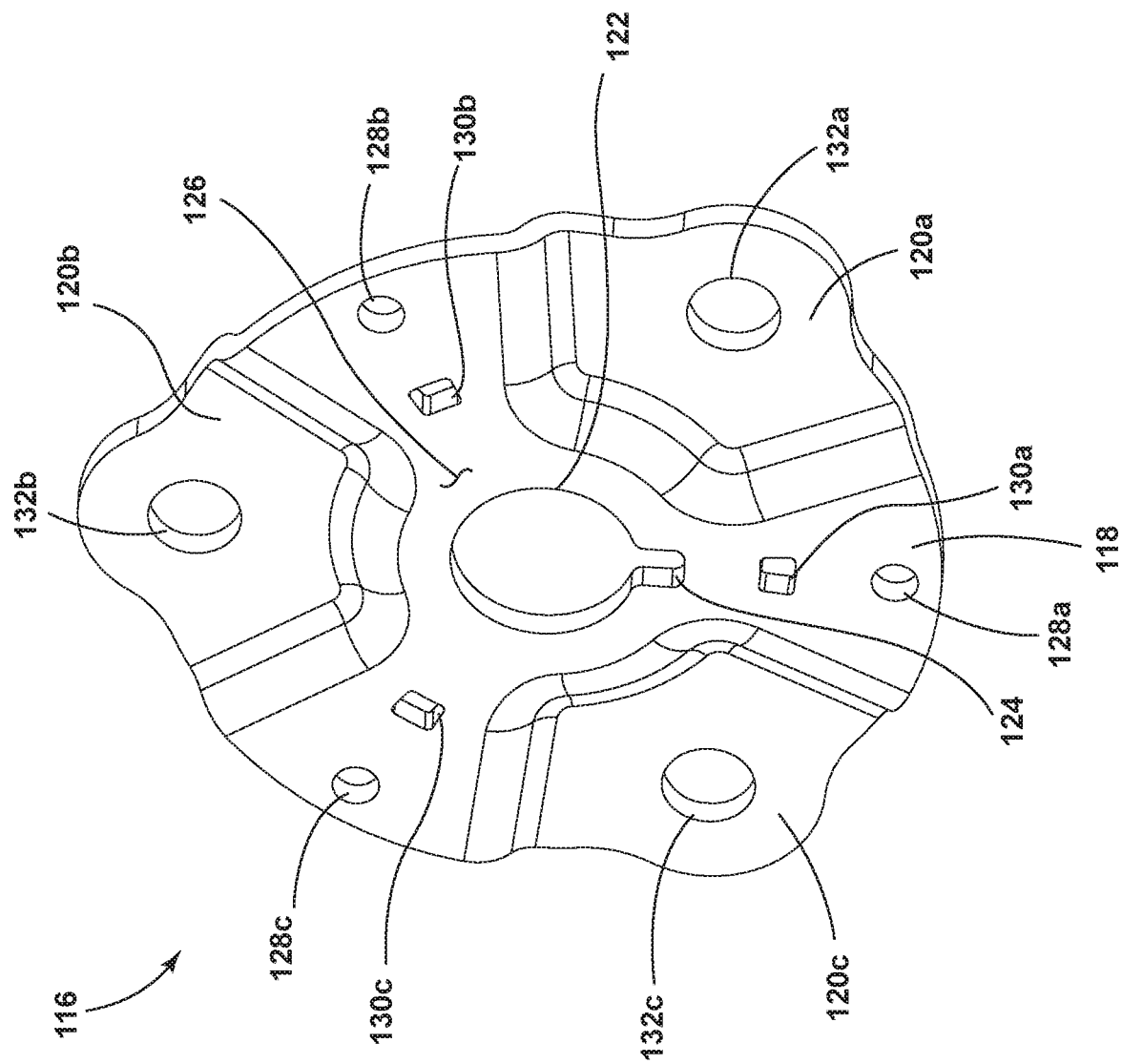
FIG. 25 is a perspective view of the outer plate, illustrating indented planar portions parallel to the first planar portion and indented from the first planar portion.
Figure 26:
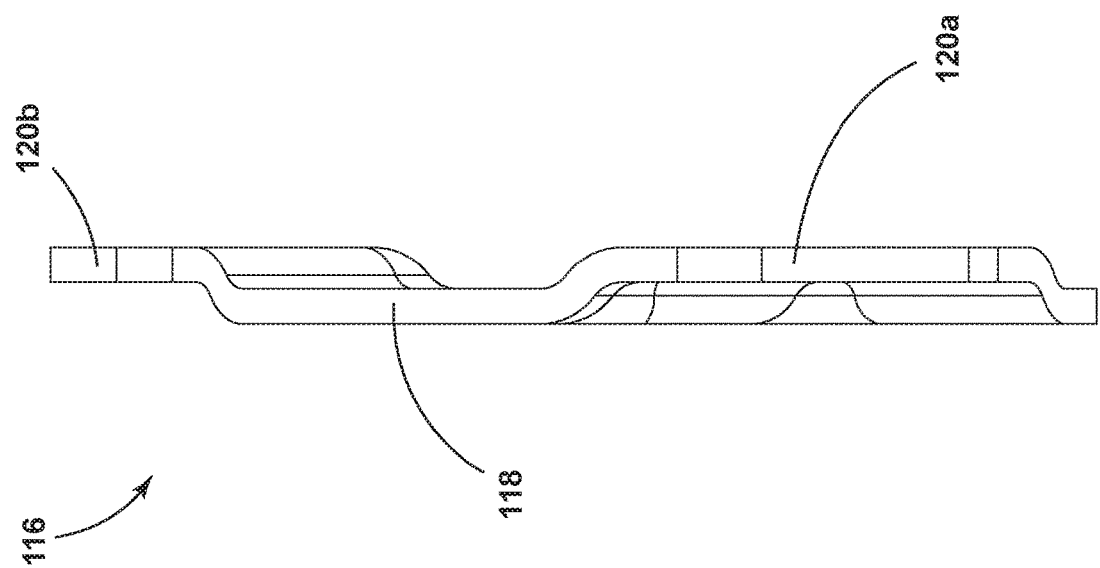
FIG. 26 is a view of the forward side of the outer plate.
Figure 27:
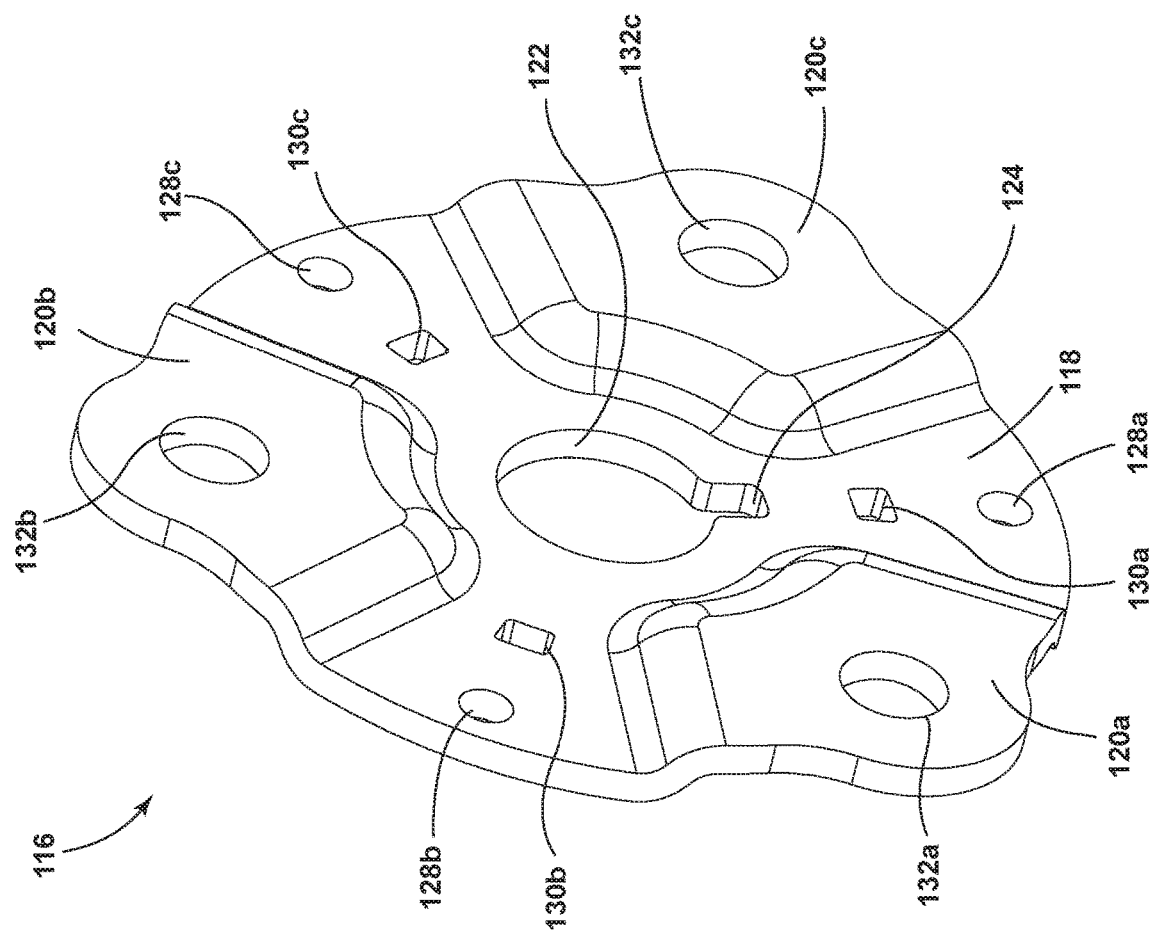
FIG. 27 is another perspective view of the outer plate, of the lateral facing side, illustrating a fastening aperture disposed through each of the indented planar portions.
Figure 28:
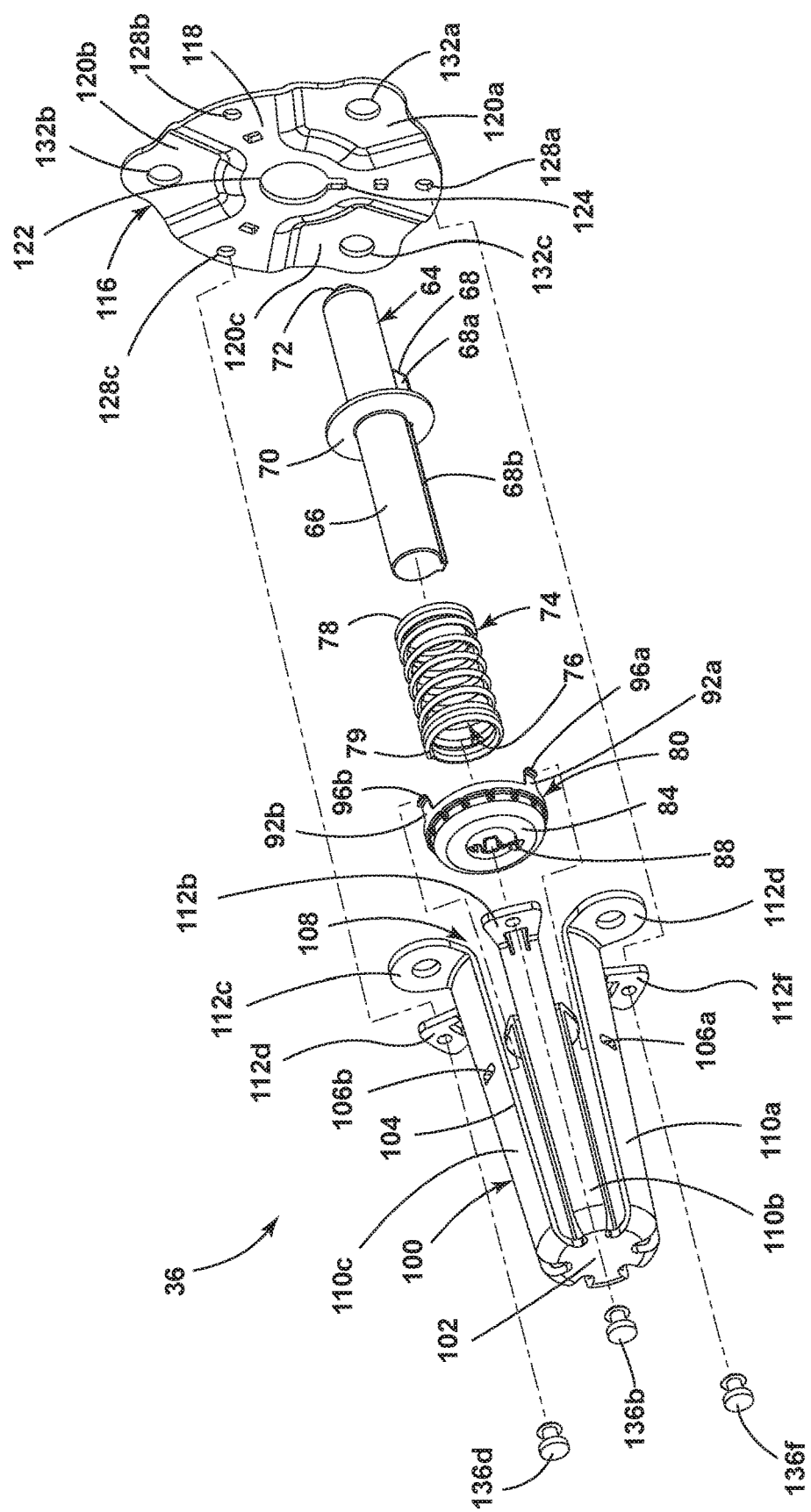
FIG. 28 is a perspective view of the retractable pivot pin assembly of FIG. 3, blown up, to show the assembly of the housing, backing cap, compression spring, rod, and outer plate.

The retractable pivot pin assembly 36 further includes a housing 100 (see particularly FIGS. 22-23). The housing 100 assists in housing the backing cap 80, the compression spring 74, and a portion of the pin 64. The housing 100 includes an end portion 102 and an elongated portion 104 extending generally orthogonally from the end portion 102. The end portion 102 is essentially planar. The elongated portion 104 includes snap-fit receivers 106a-c, which receive and retain the snap-fit fasteners 92a-c of the backing cap 80. For example, snap-fit receiver 106a receives and retains snap-fit fastener 92a of the backing cap 80, as so on. In this embodiment, the snap-fit receivers 106a-c are apertures sized and arranged to receive and retain the catch flange 96a-c of the snap-fit fasteners 92a-c of the backing cap 80. The end portion 102 and the elongated portion 104 form a chamber 108. The backing cap 80, compression spring 74, and at least a portion of the pin 64 are housed within the chamber 108. The elongated portion 104 of the housing 100, in this embodiment, takes the form of a plurality of legs 110a-f, each of which terminate in orthogonal outwardly extending flanges 112a-f, each of which include an aperture 114a-f. For example, leg 110a terminates in orthogonally extending flange 112a, which includes aperture 114a, and so on.

The retractable pivot pin assembly 36 further includes an outer plate 116 (see particularly FIGS. 24-27). The outer plate 116 closes off the chamber 108 of the housing 100, enclosing the backing cap 80, the compression spring 74, and a portion of the pin 64. The outer plate 116 includes a first planar portion 118 and indented planar portions 120a-c parallel to the first planar portion 118 and indented from the first planar portion 118. The outer plate 116 further includes a centrally located aperture 122 with a slotted portion 124 disposed through the first planar portion 118. The pin 64 extends through the centrally located aperture 122. The larger section 68a of the bit 68 of the pin 64 is slotted through the slotted portion 124 of the outer plate 116. The outer plate 116 further includes collar contacting surface 126 disposed on one side of the outer plate 116. The collar 70 of the pin 64 abuts the collar contacting surface 126 of the outer plate 116, and the collar contacting surface 126 is part of the first planar portion 118. The collar 70 of the pin 64 and the collar contacting surface 126 of the outer plate 116 prevent the compression spring 74 from pushing the pin 64 out of the retractable pivot pin assembly 36. In this embodiment, the indented planar portions 120a-c are circumferentially arranged around the centrally located aperture 122. The outer plate 116 further includes a plurality of fastening apertures 128a-c disposed through the first planar portion 118. The plurality of fastening apertures 128a-c provide the capability to attach the outer plate 116 to the housing 100. Slots 130a-c, to receive a portion of the housing 100, are disposed through the first planar portion 118 between the aperture 122 and the plurality of fastening apertures 128a-c. The plate housing 100 further includes a plurality of fastening apertures 132a-c disposed through the indented planar portions 120a-c. For example, indented planar portion 120a surrounds fastening aperture 132a, and so on. The plurality of fastening apertures 132a-c provides the capability to attach the retractable pivot pin assembly 36 to other elements, such as an element of the seatback 24, as discussed below.

To assemble the retractable pivot pin assembly 36 (see particularly FIG. 28), the backing cap 80 is placed, other side 84 first, into the chamber 108 of the housing 100. The snap-fit fasteners 92a-c of the backing cap 80 are snap-fit into the snap-fit receivers 106a-c of the housing, respectively. In other words, the snap-fit receivers 106a-c of the elongated portion 104 housing 100 have received the snap-fit fasteners 92a-c, respectively, of the backing cap 80. The compression spring 74 is placed into the chamber 108 of the housing 100, such that the second end 79 of the compression spring 74 is adjacent the backing cap 80. The pin 64 is placed into the chamber 108 of the housing 100, with the smaller section 68b of the bit 68 entering into the pin channel 76 at the first end 78 of the compression spring 74. The smaller section 68b is slotted into the slotted portion 88 of the backing cap 80. The first end 78 of the compression spring 74 abuts the collar 70 of the pin 64. The centrally located aperture 122 of the outer plate 116 is placed over the pin 64, such that the larger section 68a of the bit 68 is slotted through the slotted portion 124 of the centrally located aperture 122. The first planar portion 118 of the outer plate 116 abuts the collar 70 of the pin 64. Legs 110b, 110d, and 110f of the housing 100 are slightly shorter than legs 110a, 110c, and 110e of the housing 100 and sized so that the flanges 112b, 112d, and 112f thereof abut the first planar portion 118 of the outer plate 116. In addition, each of the legs 110*b*, 110*d*, and 110*f* include a finger 134*b*, 134*d*, 134*f* that is slotted into the slots 130*a-c* through the first planar portion 118. More specifically, finger 134*b* of leg 110*b* is slotted into slot 130*b*, finger 134*d* of leg 110*d* is slotted into slot 130*c*, and finger 134*f* of leg 110*f* is slotted into slot 130*a*. Fasteners 136*b*, 136*d*, and 136*f*, which can be rivets, among other thigs, are placed through apertures 114*b*, 114*d*, and 114*f* disposed at the flanges 112*b*, 112*d*, 112*f* of the legs 110*b*, 110*d*, 110*f* and through fastening apertures 128*a-c* disposed through the first planar portion 118 of the outer plate 116. For example, fastener 136*b* is placed through aperture 114*b* at flange 112*b* of leg 110*b* and through fastening aperture 128*b* through first planar portion 118 of the outer plate 116, and so on. Legs 110*a*, 110*c*, and 110*e* of the housing 100 are slightly longer than the legs 110*b*, 110*d*, and 110*f* of the housing 100 and are sized so that the flanges 112*a*, 112*c*, 112*e* thereof abut the indented planar portions 120*a-c*. For example, flange 112*a* of leg 110*a* abuts indented planar portion 120*a*. Each of the flanges 112*a*, 112*c*, 112*e* include the apertures 114*a*, 114*c*, 114*e*, disposed therein, which line up with fastening apertures 132*a-c* disposed through the indented planar portions 120*a-c* of the outer plate 116, which allows the entire retractable pivot pin assembly 36 to attach to other elements, such as an element of the seatback 24, as discussed below. For example, aperture 114*a* disposed through flange 112*a* of leg 110*a* lines up with fastening aperture 132*a* at indented planar portion 120*a* of the outer plate 116, creating a contiguous aperture to provide an attachment opportunity.

Figure 29:
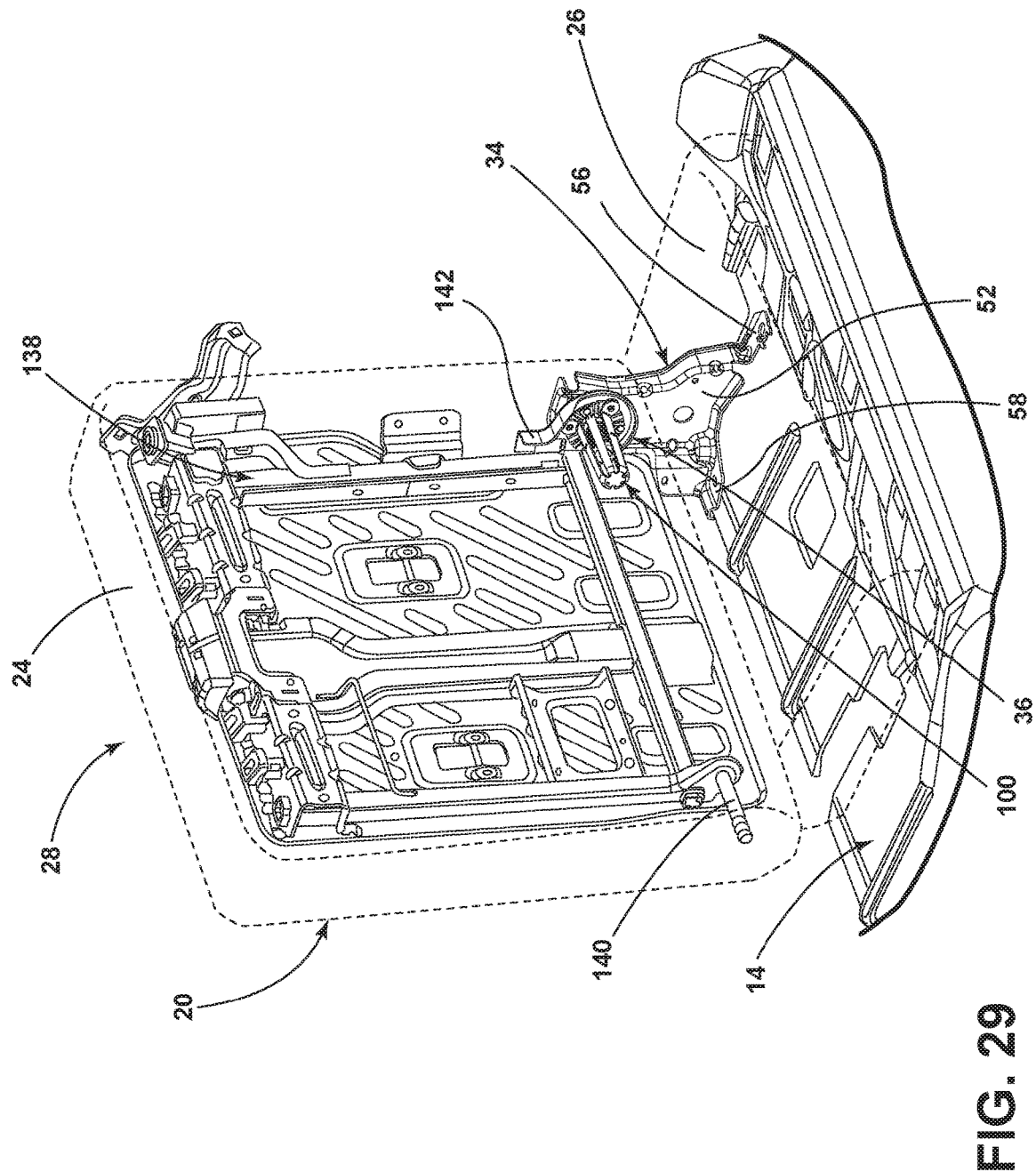
FIG. 29 is a perspective view of the frame assembly of the rear seating assembly of FIG. 3, illustrating the frame assembly attached to the retractable pivot pin assembly through a bracket, and the retractable pivot pin assembly interacting with the riser attached to the floor pan.

Referring to FIG. 29, as mentioned above, the seatback 24 includes the frame assembly 138, which provides structural support for the seatback 24. The frame assembly includes a fixed pin 140. The fixed pin 140 can be inserted into the second rear seating assembly 32 or an element of the frame 12 adjacent the second rear seating assembly 32. The fixed pin 140 acts as a second pivot point, in addition to the pin 64 of the retractable pivot pin assembly 36, allowing the seatback 24 to pivot. The retractable pivot pin assembly 36 is attached to the frame assembly via a bracket 142. The pin 64 of the retractable pivot pin assembly 36 is disposed through the pin-receiving aperture 38 of the riser 34, which is attached to the floor pan 14, allowing the seatback 24 to pivot within the pin-receiving aperture 38 about the axis created by the pin 64. The seatback 24 is illustrated in FIG. 29 in the upright position 28 (in phantom). To transition to the folded position 30, the seatback 24 pivots about the pin 64 of the retractable pivot pin assembly 36 within the pin-receiving aperture 38 of the riser 34.

Figure 30:
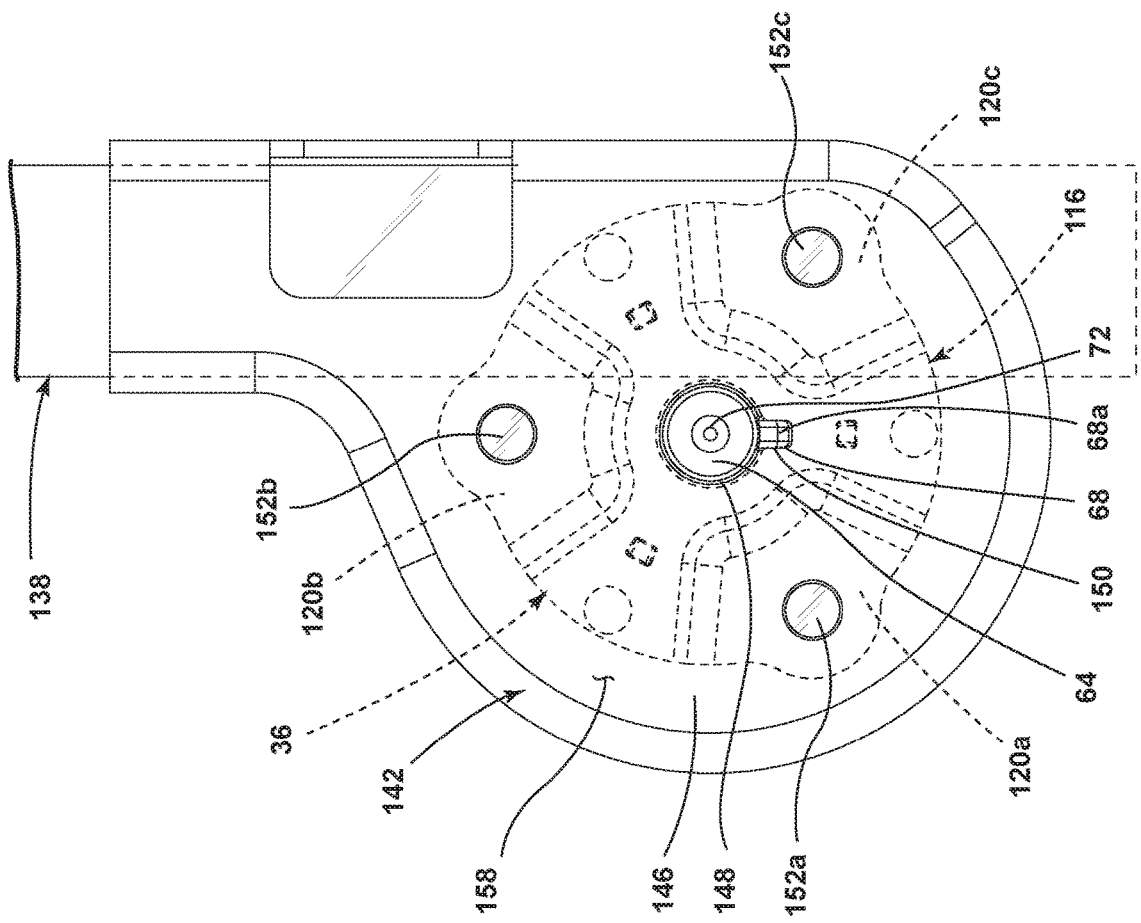
FIG. 30 is a view of the lateral facing side of the retractable pivot pin assembly of FIG. 3 attached to the bracket, which is attached to the frame assembly, illustrating the pin extending through an aperture in the bracket.

Referring to FIG. 30, the frame assembly 138 is attached to the bracket 142. The retractable pivot pin assembly 36 is also attached to the bracket 142, with the pin 64 forward of the frame assembly 138. The bracket 142 includes a first side 144 (see FIG. 31) and a second side 146 opposite the first side 144. The bracket 142 includes an aperture 148 with a slotted portion 150 that extends from the first side 144 through the second side 146. The bracket 142 includes apertures (not shown) around aperture 148 that are used to fasten the retractable pivot pin assembly 36 to the bracket 142. The retractable pivot pin assembly 36 is attached to the first side 144 of the bracket 142. In this embodiment, fastener 152*a* is placed through one of the apertures of the bracket, through matching fastening aperture 132*a* of the outer plate 116 of the retractable pivot pin assembly 36, and through matching aperture 114*a* of the housing 100. Fasteners 152*b*, 152*c* are similarly placed through apertures of the bracket, through matching apertures 132*b*, 132*c* of the outer plate 116, and through matching apertures 114*c*, 114*e* of the housing 100, respectively. The pin 64 of the retractable pivot pin assembly 36 protrudes through the aperture 148 of the bracket 142. The larger section 68*a* of the bit 68 is slotted within the slotted portion 150.

Figure 31:
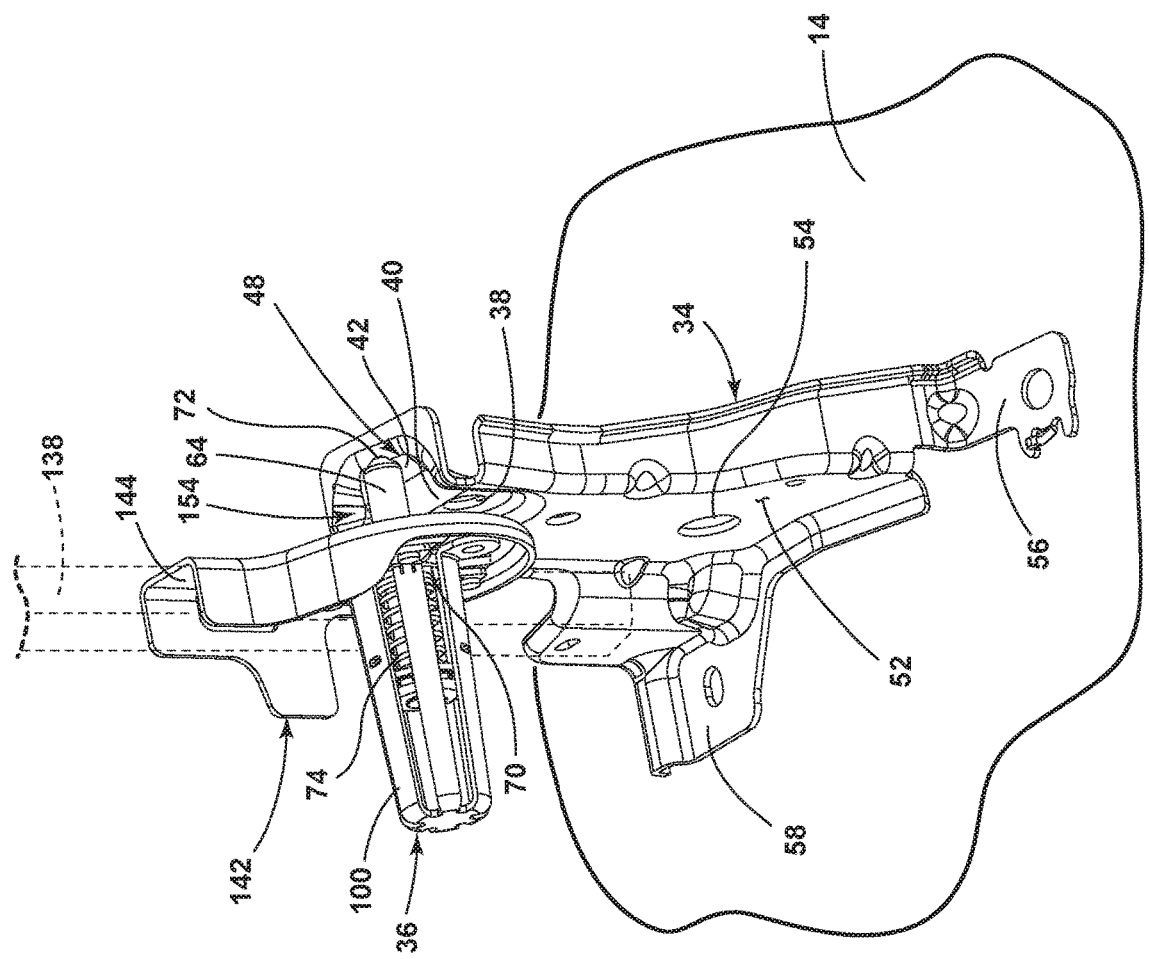
FIG. 31 is a perspective view of the pin of the retractable pivot pin assembly attached to the seatback of the rear seating assembly of FIG. 3, illustrating the pin entering a mouth of the riser in an extended state and interacting with an angled portion of a pin-guide surface.

Referring to FIGS. 31-34, the act of the pin 64 of the retractable pivot pin assembly 36 being inserted into the pin-receiving aperture 38 of the riser 34, to pivotably attach the seatback 24 to the riser 34, is illustrated. Referring to FIG. 31, the pin 64 of the retractable pivot pin assembly 36 approaches the mouth 48 of the riser 34. The pin 64 is in a natural extended state 154, due to the force of the compression spring 74 on the collar 70 of the pin 64. The chamfered end 72 of the pin 64 contacts the angled portion 42 of the pin-guide surface 40.

Figure 32:
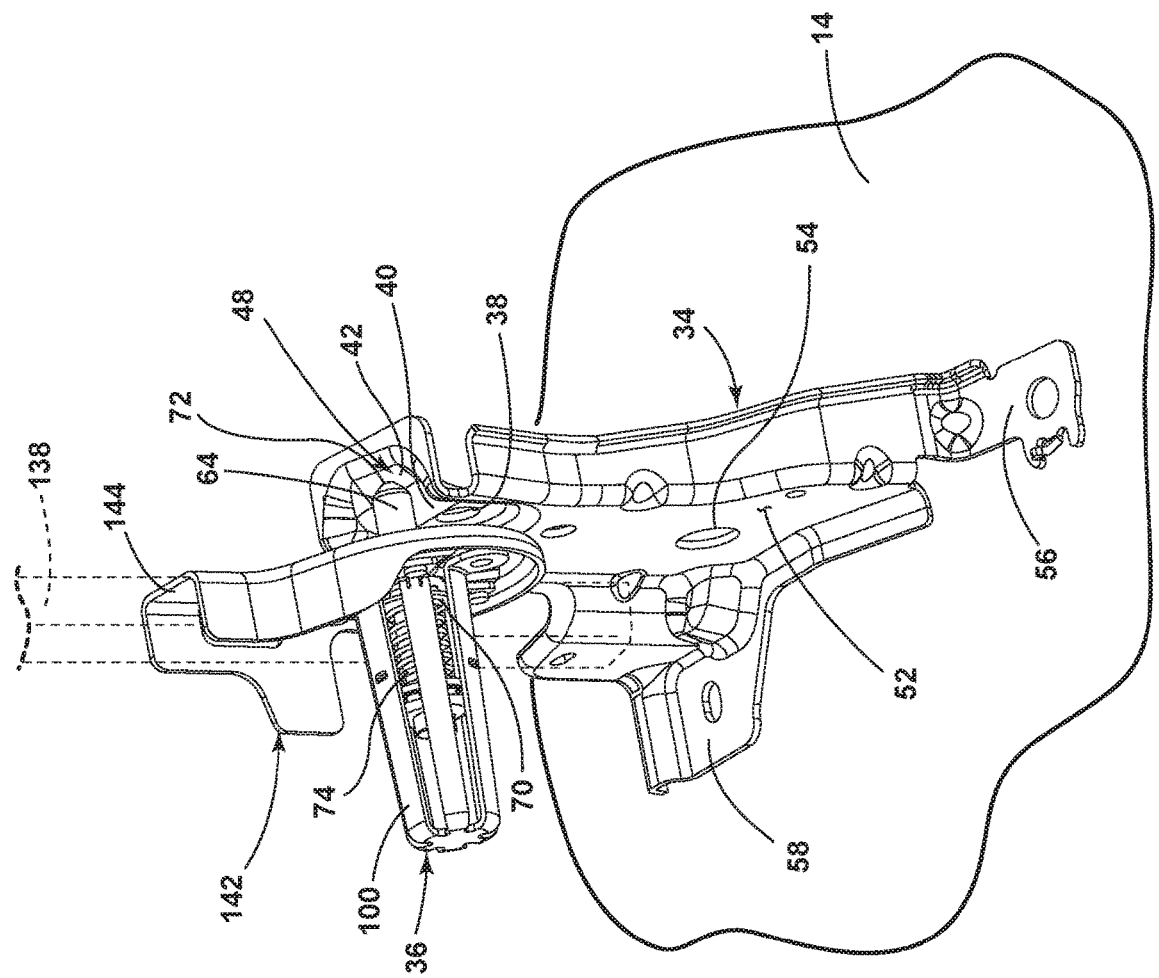
FIG. 32 is a perspective view of the pin progressing toward the pin-receiving aperture and the angled portion of the pin-guide surface forcing the pin from an extended state toward a retracted state where the pin retracts into the housing.

Referring to FIG. 32, the pin 64 is being moved toward the pin-receiving aperture 38. The angled portion 42 of the pin-guide surface 40 forces the pin 64 progressively toward a retracted state (see below) within the retractable pivot pin assembly 36. The compression spring 74 continues to exert a force on the collar 70 of the pin 64, attempting to push the pin 64 to the extended state 154. The lip 46 partially surrounding the pin-receiving aperture 38 serves to prevent the pin 64 from moving too far from the pin-receiving aperture 38 and leaving the pin-guide surface 40, which aids in guiding the pin 64 to the pin-receiving aperture 38.

Figure 33:
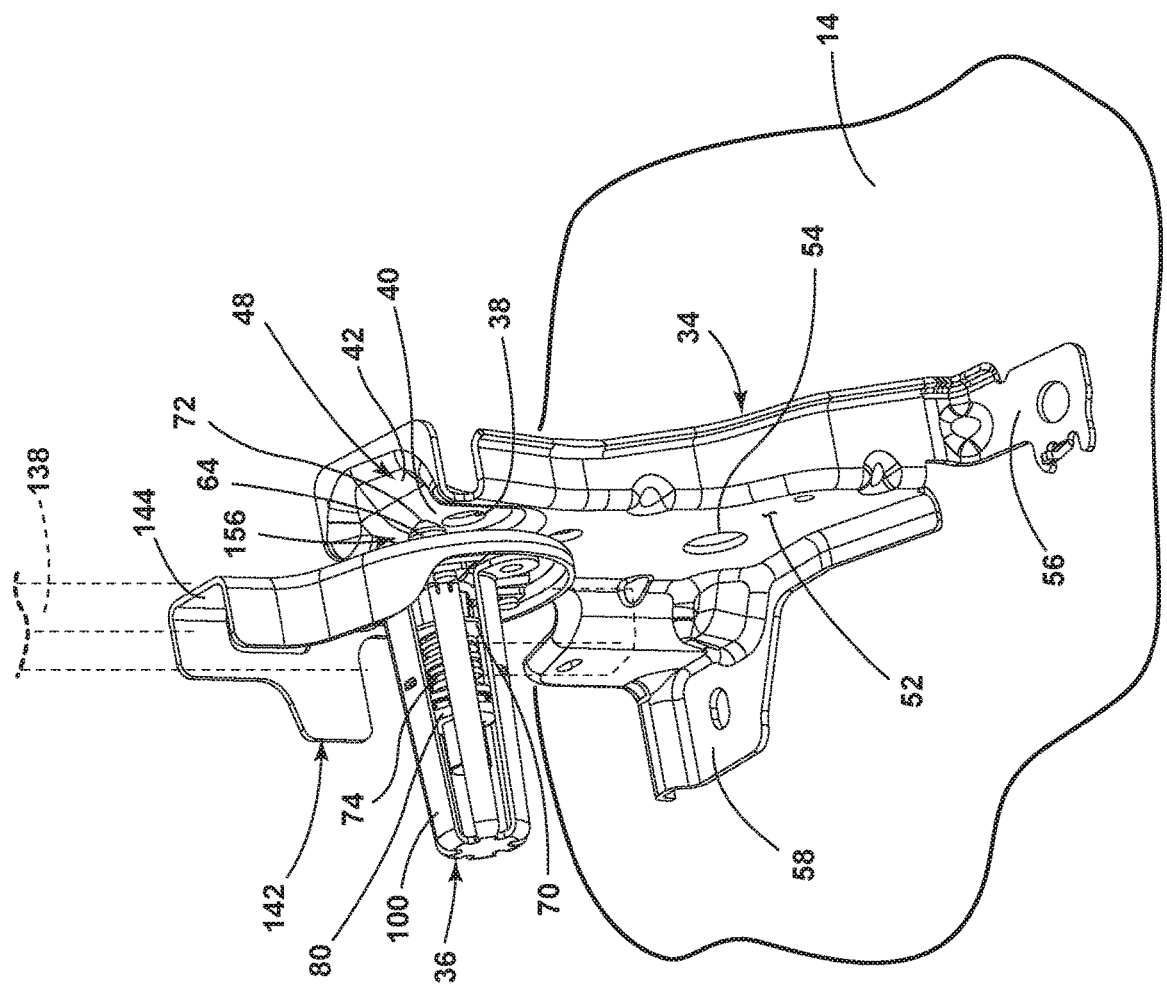
FIG. 33 is a perspective view of the pin having progressed to adjacent the pin-receiving aperture and the pin-guide surface has forced the pin to the retracted state.

Referring to FIG. 33, the pin 64 has moved adjacent to the pin-receiving aperture 38. The pin-guide surface 40 has forced the pin 64 to the retracted state 156 within the retractable pivot pin assembly 36. The collar 70 of the pin 64 has become closer to the backing cap 80. The compression spring 74 continues to exert a force on the collar 70 of the pin 64, attempting to push the pin 64 to the extended state 154. Because the backing cap 80 includes an aperture 86, the pin 64 can slide through the aperture 86 while the backing cap 80 stays attached to the housing 100.

Figure 34:
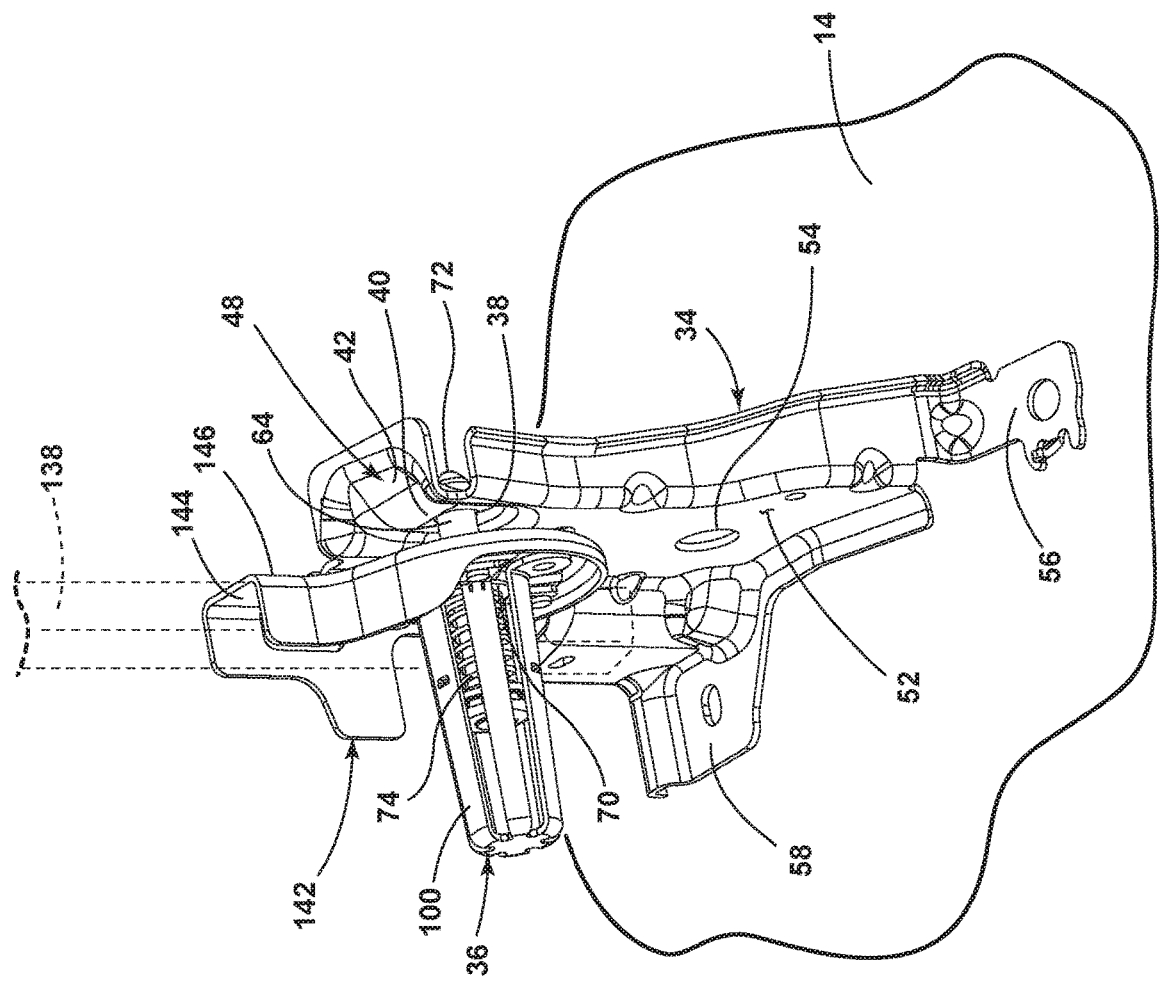
FIG. 34 is a perspective view of the pin in the extended state extending through the pin-receiving aperture of the riser, thus pivotably attaching the seatback to the riser.

Referring to FIG. 34, the pin 64 is now inserted into the pin-receiving aperture 38. The bracket 142 is positioned between the components of the retractable pivot pin assembly 36 (including the compression spring 74, the outer plate 116, and the housing 100) and the riser 34. As the pin 64 moves into the pin-receiving aperture 38, the compression spring 74 pushes on the collar 70 of the pin 64 and causes the pin 64 to return to the extended state 154. The seatback 24 can now pivot between, to, and from the upright position 28 (FIG. 1) and the folded position 30 (FIG. 2), with the pin 64 pivoting within the pin-receiving aperture 38. The second side 146 of the bracket 142 has a planar surface 158 that is parallel to the planar vertical surface 52 of the riser 34 (FIG. 30). The collar 70 of the pin 64 is parallel to the planar vertical surface 52 of the riser 34 and parallel to the planar surface 158 of the second side 146 of the bracket 142. The pin channel 76 of the compression spring 74 is orthogonal to the planar vertical surface 52 of the riser 34 and the planar surface 158 of the second side 146 of the bracket 142.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A riser for a seating assembly of a vehicle comprising:
a pin-receiving aperture;
a pin-guide surface at least partially surrounding the pin-receiving aperture, the pin-guide surface having an angled portion; and a lip partially surrounding the pin-receiving aperture defining a boundary of the pin-guide surface;

wherein, the angled portion of the pin-guide surface and the lip form a mouth leading toward the pin-receiving aperture.

2. The riser of claim 1 wherein the lip surrounds at least 180 degrees of the pin-receiving aperture.

3. The riser of claim 1 further comprising:
a vertical support structure with a planar vertical surface, wherein the pin-receiving aperture is parallel to the planar vertical surface and on a plane indented relative to the planar vertical surface.

4. The riser of claim 3, the pin-guide surface including a planar portion surrounding the pin-receiving aperture that is parallel to the planar vertical surface of the vertical support structure.

5. The riser of claim 1 furthering comprising: a seat-receiving aperture located below the pin-receiving aperture.

6. The riser of claim 4, wherein a transition from the planar vertical surface of the vertical support structure to the planar portion of the pin-guide surface forms at least a portion of the lip.

7. The riser of claim 1, wherein the mouth is disposed above the pin-receiving aperture.

8. A retractable pivot pin assembly for a vehicle comprising:
a housing forming a chamber;
a compression spring disposed within the chamber of the housing, the compression spring defining a pin channel and including a first end and a second end;
a backing cap disposed within the chamber of the housing, the backing cap abutting the second end of the compression spring and including an aperture;
a pin partially housed within the chamber of the housing, with a portion of the pin disposed within the pin channel of the compression spring, the pin comprising:
a cylindrical shaft;
a collar extending out from the cylindrical shaft, and disposed such that the first end of the compression spring abuts the collar;
a bit extending out from the cylindrical shaft along a length of the cylindrical shaft;
wherein the pin has an extended state and can retract within the housing to a retracted state, with the compression spring biasing the pin to the extended state, and the pin extending through the aperture of the backing cap in the retracted state.

9. The retractable pivot pin assembly of claim 8, the housing further comprising:
an end portion; and
an elongated portion laterally extending from the end portion, the elongated portion having snap-fit receivers;
the end portion and the elongated portion forming the chamber that houses at least a portion of the backing cap, the compression spring, and the pin;
wherein the backing cap further comprises snap-fit fasteners arranged around a perimeter of the backing cap; and
wherein the snap-fit receivers of the elongated portion of the housing have received the snap-fit fasteners of the backing cap.

10. The retractable pivot pin assembly of claim 9 further comprising:
an outer plate comprising:
a first planar portion;
indented planar portions parallel to the first planar portion and indented from the first planar portion;
a centrally located aperture with a slotted portion disposed through the first planar portion;
a plurality of fastening apertures disposed through the first planar portion; and
a plurality of fastening apertures disposed through the indented planar portions;
wherein, the elongated portion of the housing further comprises a plurality of legs terminating in orthogonally extending flanges, each of the flanges including an aperture;
wherein, the outer plate is fastened to the housing via fasteners extending through the plurality of fastening apertures disposed through the first planar portion of the outer plate and a portion of the apertures of the flanges of the plurality of legs of the housing.

11. The retractable pivot pin assembly of claim 10,
wherein a portion of the plurality of legs of the housing each include a finger;
wherein the outer plate further includes slots disposed through the first planar portion adjacent the plurality of fastening apertures;
wherein the finger of each of the portion of the plurality of legs is slotted within the slots.

12. The retractable pivot pin assembly of claim 10,
wherein, the flanges of a portion of the plurality of legs abut the indented planar portion of the outer plate; and
wherein, the flanges that abut the indented planar portion of the plate each include an aperture disposed through the flange and the aperture of the flange lines up with one of the plurality of fastening apertures disposed through the indented planar portion of the outer plate.

13. A vehicle comprising:
a floor pan;
a riser attached to the floor pan, the riser comprising a pin-guide surface at least partially surrounding a pin-receiving aperture, the pin-guide surface having an angled portion; and
a seatback comprising a retractable pivot pin assembly, which includes
a housing with a chamber,
a backing cap disposed within the chamber,
a pin with cylindrical shaft and a collar extending out from the cylindrical shaft, and
a compression spring having a pin channel within which the a portion of the cylindrical shaft of the pin is disposed, a first end abutting the collar of the pin, and a second end abutting the backing cap
wherein, the seatback is pivotably attachable to the riser, with the pin of retractable pivot pin assembly having a retracted state where the pin-guide surface of the riser forces the pin to retract into the housing until the pin is positioned adjacent the pin-receiving aperture of the riser, at which the point the compression spring forces the pin into an extended state through pin-receiving aperture thus pivotably attaching the seatback to the riser.

14. The vehicle of claim 13,
wherein, during insertion of the pin into the pin-receiving aperture, as the pin moves toward the pin-receiving aperture, the angled portion of the pin-guide surface forces the pin toward the retracted state within the retractable pivot pin assembly.

15. The vehicle of claim 13,
wherein, during insertion of the pin into the pin-receiving aperture, as the pin moves adjacent to the pin-receiving aperture, the pin-guide surface forces the pin to the retracted state within the retractable pivot pin assembly.

16. The vehicle of claim 13, the seatback further comprising:
- a frame assembly providing structural support for the seatback; and
- a bracket connected to the frame assembly, the bracket comprising a first side, a second side opposite the first side, and an aperture that extends from the first side through the second side;

wherein the retractable pivot pin assembly is attached to the first side of the bracket, such that the pin of the retractable pivot pin assembly protrudes through the aperture of the bracket; and wherein the bracket is between the compression spring of the retractable pivot pin assembly and the riser.

17. The retractable pivot pin assembly of claim 8,
the aperture of the backing cap including a slotted portion to match and receive the bit of the pin when the pin is in the retracted state.

18. The retractable pivot pin assembly of claim 8,
the pin including a chamfered end disposed outside of the chamber of the housing.

19. The vehicle of claim 13,
the aperture of the backing cap including a slotted portion to match and receive the bit of the pin when the pin is in the retracted state.

20. The vehicle of claim 14,
the pin including a chamfered end disposed outside of the chamber of the housing; and
during insertion of the pin into the pin-receiving aperture, the angled portion of the pin-guide surface contacts the chamfered end of the pin.

\* \* \* \* \*